US006989466B2

(12) United States Patent
Benecke et al.

(10) Patent No.: US 6,989,466 B2
(45) Date of Patent: Jan. 24, 2006

(54) REVERSIBLE CROSSLINKED POLYMERS, BENZYLIC HYDROXYL CROSSLINKERS AND METHOD

(75) Inventors: Herman P. Benecke, Columbus, OH (US); Richard A. Markle, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 149 days.

(21) Appl. No.: 10/404,284

(22) Filed: Mar. 31, 2003

(65) Prior Publication Data

US 2003/0225238 A1    Dec. 4, 2003

Related U.S. Application Data

(60) Division of application No. 09/722,203, filed on Nov. 24, 2000, now Pat. No. 6,559,263, which is a continuation-in-part of application No. PCT/US00/14722, filed on May 25, 2000.

(51) Int. Cl.
*C08G 18/80* (2006.01)

(52) U.S. Cl. ............................ 568/626; 528/85; 528/45

(58) Field of Classification Search ................ 568/626; 528/85
See application file for complete search history.

(56) References Cited

U.S. PATENT DOCUMENTS

| 3,503,927 A | 3/1970 | Chang et al. |
| 3,684,769 A | 8/1972 | Abbott et al. |
| 4,088,627 A | 5/1978 | Gergen et al. |
| 4,171,298 A | 10/1979 | Minagawa et al. |
| 4,201,853 A | 5/1980 | Henry et al. |
| 4,683,279 A | 7/1987 | Milligan et al. |
| 5,047,456 A | 9/1991 | Onwumere et al. |
| 5,097,010 A | 3/1992 | Markle et al. |
| 5,219,974 A | 6/1993 | Onwumere et al. |
| 5,491,210 A | 2/1996 | Onwumere et al. |

FOREIGN PATENT DOCUMENTS

| JP | 08120047 A2 | 5/1996 |
| JP | 08158155 A2 | 6/1996 |
| JP | 08158156 A2 | 6/1996 |
| JP | 11322886 A | 11/1999 |
| WO | WO 91/11476 A2 | 8/1991 |

OTHER PUBLICATIONS

Gedan-Smolka, M. et al.; Thermal Deblocking of Masked Low Molecular Isocyanates. I. Aliphatix Isocyanates; Thermochimica Acta; vol. 3; 2000; pp. 95-105.

Mukaiyama, T. et al.; On the Thermal Dissociation of Organic Compounds. X. The Effects of the Solvents (Amines and Fatty Acids) on the Thermal Dissociation of Urethans; J. Am. Chem. Soc.; vol. 78; 1956; pp. 1946-1948.

Piantadosi, C. et al.; The Preparation of Cyclic Glycerol Acetals by Transacetalation; J. Am. Chem. Soc.; vol. 80; Dec. 12, 1958; pp. 6613-6617.

Szycher, M.; Polyurethanes; 1999; p. 3-13.

Wicks, jr., Z.W.; Blocked Isocyanates; Progress in Organic Coatings; vol. 3; 1975; pp. 73-99.

*Primary Examiner*—Rachel Gorr
(74) *Attorney, Agent, or Firm*—Klaus H. Wiesmann

(57) ABSTRACT

A polymer having a crosslinked structure made from a polyol and an isocyanate where the crosslinks contain urethane and/or ester bonds made from the reaction of a benzylic hydroxyl group and an isocyanate group.

2 Claims, 3 Drawing Sheets

REVERSIBLE CROSSLINKED POLYMERS, BENZYLIC HYDROXYL CROSSLINKERS AND METHOD

This application is a divisional application of and claims the benefit of U.S. application Ser. No. 09/722,203 filed Nov. 24, 2003 issued as U.S. Pat. No. 6,559,263; which application claims priority as a continuation-in-part application of PCT application number PCT/US00/14722, filed on May 25, 2000, and designating the United States of America.

The entire contents of the above referenced applications including specifications, claims, abstracts, and drawings are hereby incorporated by reference as if fully rewritten herein.

FIELD OF THE INVENTION

The invention involves crosslinked polyurethanes and other polymers not conventionally known as polyurethanes, with added urethane crosslinks where the crosslinkers are based on compounds having one or more benzylic hydroxyl groups, and methods of making the polymers and crosslinkers. The polymers are useful to make elastomers, fibers, sheets, moldings, coatings and other articles typically produced from polymers.

BACKGROUND OF THE INVENTION

Organic polyisocyanates have been reacted with compounds having active hydrogen groups, such as hydroxyl groups, to produce a wide variety of useful urethane containing materials such as coatings, hot-melt adhesives, moldings and materials used in injection molding applications and composite or laminate fabrications. Urethane bonds are used ubiquitously in polymer chemistry to produce a wide variety of useful compositions. Typical of the art is the patent to Markle et al, U.S. Pat. No. 5,097,010.

The urethane bond is conveniently obtained by the addition reaction of an isocyanate group (either an aliphatic or an aromatic isocyanate) and an aliphatic alcohol or an aromatic (also known as aryl) hydroxyl group (also known as a phenolic group). The urethane bond is formed between the oxygen atom of the hydroxyl group and the carbon atom of the isocyanate group. An alternate term often used is "urethane linkage". This reaction is reversible at sufficiently high temperatures as indicated by showing the following reaction as an equilibrium process.

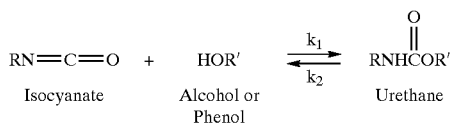

$$RN{=}C{=}O \; + \; HOR' \underset{k_2}{\overset{k_1}{\rightleftarrows}} RNHCOR'$$

Isocyanate      Alcohol or Phenol      Urethane

In this equation, R is alkyl or aryl and R' independently is alkyl or aryl. The equilibrium constant K is defined as $k_1/k_2$ where $k_1$ is the rate constant of the forward, or urethane bond forming reaction, where $k_2$ is the rate constant of the reverse reaction involving reformation of RNCO and R'OH. These rate constants each vary as a function of the temperature, with $k_1$ and $k_2$ both increasing as the temperature increases. However, $k_1$ will dominate (i.e., $k_1 \gg k_2$) over some temperature range between ambient temperature and some intermediate higher temperature since the forward reaction typically has a lower activation energy than the reverse reaction.

As a result of these activation energy differences, $k_2$ will increase more rapidly than $k_1$ as the temperature is increased. Thus, at some higher temperature, $k_2$ may equal $k_1$ (where the equilibrium constant K=1) and may in certain cases become appreciably greater than $k_1$ at still higher temperatures. Hence, the equilibrium constant will range from quite high values at ambient temperature but can become relatively smaller at sufficiently high temperatures so that significant and useful concentrations of isocyanate groups will be present.

The forward, or urethane bond forming reaction, can be affected by simply heating an equimolar mixture of isocyanate and hydroxyl groups to the temperature at which $k_1$ is large enough that urethane bond formation occurs in an acceptable, or practical, period of time (from a few minutes to several hours). Catalysts, such as tertiary amines or certain organotin compounds, can speed both the forward and reverse processes, but are not necessary to bring about the urethane bond forming reaction or the establishment of equilibrium. If both compound types are difunctional, that is, if they are diisocyanates and dialcohols or diphenols, the forward reaction will produce polymeric products (polyurethanes) of very high molecular weights. The achievable molecular weight of fully reacted (i.e., of essentially non-reversed) pairs will be limited by the presence and concentration of monofunctional isocyanates or monofunctional alcohols; by the isocyanate concentration and the dialcohol or the diphenol concentrations not being equal to each other; or, by the intervention of adventitious impurities which deplete the amount of either isocyanate or hydroxyl groups by side reactions. However, as the temperature of the polyurethane is further increased and $k_2$ increases faster in comparison to the increase in $k_1$, significant and measurable reverse reaction to isocyanate and either alcohol or phenol will occur. The approximate reversion onset temperatures of urethanes derived from representative combinations of aliphatic or aryl isocyanates and alkyl or aryl hydroxyl groups (as defined earlier) have been previously reported by Z. W. Wicks, Jr., "Blocked Isocyanates" Progress in Organic Coatings, 3, pp. 73–99 (1975) as shown in Table 1 below:

TABLE 1

| Isocyanate Type | Alcohol Type | Approximate Urethane Reversion Onset Temperature (° C.) |
|---|---|---|
| Aryl (e.g. MDI)[a] | Aryl (e.g. Phenol) | 120 |
| Alkyl (e.g. HDI)[b] | Aryl (e.g. Phenol) | 180 (118)[c] |
| Aryl (e.g. MDI) | Alkyl (e.g. n-Butanol) | 200 |
| Alkyl (e.g. HDI) | Alkyl (e.g. n-Butanol) | 250 |

[a]MDI = 4,4'-diphenylmethane diisocyanate
[b]HDI = 1,6-hexamethylene diisocyanate
[c]a wide variation of reversion onset temperatures exists in the literature for urethanes prepared from aliphatic isocyanates and phenolic compounds, the lowest being 118° C. (M. Gedan-Smolka, Thermochimica Acta, 351, pp 95–105 (2000).)

These reversion onset temperatures are approximate values which represent the onset of reversal or a temperature where the practical effect of reversal, such as the onset of distillation or evaporation of a phenolic compound or an alcohol from a heated mixture occurs, or where infrared (IR) spectroscopy of heated samples indicates the onset of isocyanate and alcohol or phenol formation from a previously unreversed urethane compound.

Crosslinking in polymers is known to improve their physical properties and increase mechanical properties (such as but not limited to tensile and flexural strengths and moduli). Typically, crosslinked polymers do not melt or dissolve in solvents (for the uncrosslinked polymers). Hence they cannot be melt or solution processed. However, if crosslinks are present that contain at least one thermally reversible bond, the polymer should maintain the advantageous properties associated with crosslinking while below the reversion onset temperature of such crosslinks, but should be readily either melt or solution processable at some temperature above the reversion onset temperature.

In the work described herein, it was sought to identify combinations of particular diisocyanates or polyisocyanates and dialcohols or diphenols, or polyalcohols or polyphenols, which would possess reversibility of practical utility (described further below) in terms of some relatively high temperature at which onset of reversion would occur. This would allow the preparation of polymers with both backbone urethane bonds (i.e. urethane bonds as part of the structure of the long molecular strands constituting a polymer chain), and crosslinking urethane bonds (i.e. urethane bonds connecting two of the long molecular strands constituting a polymer chain with bridging bonds, which result in dramatic increases in average molecular weight, such as for example a doubling thereof) which might be expected to have practical utility up to, or very close to, the urethane reversion onset temperature as described above. If sufficient reversible bonds, including crosslinks, are incorporated into such a reversible bond-containing polymer structure, polymers may be formed at some elevated temperature, by first heating the mixture of reactive components to some temperature above the practical reversion onset temperature such that a mixture of molten, or dissolved, partially assembled, urethane bond-containing, polymer fragments is established. Such mixture will be easily stirrable, have a low viscosity, and can be melt processed by methods such as melt spinning of fibers and fabrication of components by injection molding and extrusion processing. It will also be solution processable, provided the mixture is heated in a solvent which dissolves both the starting components and partially assembled, but uncrosslinked components. For example, both dry and wet fiber spinning of fibers are possible. As this mixture is cooled below this reversion onset temperature, the isocyanates and hydroxyl functional groups will recombine to reform urethane bonds providing a high molecular weight and crosslinked polymer structure having the advantages provided by the original crosslinks.

At low to moderate levels of crosslinking, polymers that are nonmeltable and nonsoluble in solvents which readily dissolve the uncrosslinked polymer will be obtained. However, at lower levels of crosslinking these crosslinker polymers will either be inherently tacky or will become tacky when heated above their softening temperature ($T_g$) and will swell in solvents (for the uncrosslinked polymer), while at intermediate levels of crosslinking these properties (tackiness at room temperature, or the occurrence of the increase in tackiness, when heated above $T_g$, and swelling in solvents) will begin to decrease to the point where they are no longer observed. When inherently soft polymers (i.e. ones which are above their $T_g$, or softening temperature, but below the $T_m$, or melting, temperatures) are crosslinked at low to moderate levels they will exhibit elastomer properties. That is, they will be extensible under low to moderate pulling stress but will resist extension with forces that can become considerable (i.e. moderate to high tensile strength) depending on the actual level of crosslinking and the other molecular properties of the polymers. When the extension stress is released these polymers will retract to their original unstressed dimensions.

Historically, elastomers were known for many years as homopolymers (such as natural rubber, or high molecular weight cis-1,4-polyisoprene) or random copolymers (such as styrene-co-butadiene in which the butadiene is the major component and is present as a randomly distributed combination of 1,4- and 1,2-butadiene units, with the 1,4-form dominating). Further, these polymers only achieved commercial viability in such valuable end uses as automobile tire treads or carcasses, radiator hoses, or fan belts, and so on, when the polymer molecules were chemically crosslinked with strong covalent, or in some cases, ionic, bonds which were nonreversible once formed. Such elastomers may have crosslinks between as few as one or two per 1000 polymer backbone building blocks (i.e. monomer units incorporated into the backbone) or as many as four or five per 100 polymer backbone building blocks. However, more typically such elastomers may have from five to ten crosslinks per 1000 polymer backbone building blocks (i.e. monomer units incorporated into the backbone) up to one to three per 100 polymer building blocks. The optimal level of crosslinking for desired elastomeric properties will vary somewhat as a function of both polymer variables such as molecular weight and molecular weight distribution and the particular elastomer mechanical properties desired.

Additionally, reinforcing fillers (such as carbon black, clays, silica and so on) have also been found to be either necessary, or very useful, in concert with the crosslinking, to provide the desired end use properties. More recently, starting in the decade of the 1960's, it was discovered that strong, highly elastic, thermoplastic (i.e. meltable and melt processable) elastomers were possible when soft segment polymer molecules, i.e. ones with a subambient $T_g$, and hard segment polymer molecules, i.e. ones with both $T_g$ and $T_m$ above ambient temperature, were covalently joined together in appropriate sequences and relative molecular masses. For example, block copolymers in which soft, high cis,-1,4-butadiene or cis-1,4-isoprene polymer block sequences were attached to two anchor, or external, polystyrene block sequences, were found to be tough elastomers, even without the addition of reinforcing fillers such as carbon black or fumed silicon. Yet these block copolymers, consisting of polystyrene-cis-1,4-diene-polystyrene (A-B-A block copolymers) in which the polystyrene blocks are, by convention, A blocks and the cis-1,4-diene blocks are by convention B blocks) melt when heated above the melting point ($T_m$) of the polystyrene (i.e. hard, A) blocks. Kraton™ was the first, and is still one of the important, commercial products of this class. The soft, subambient $T_g$ polydiene blocks must be the internal or B block and the structure must be at least A-B-A, although it can be more extended, e.g. A-B-A-B-A or higher, or branched, or star structures, so long as the hard A blocks are the ends or anchors. The molecular weights of both the hard A and soft B blocks must be above some minimum values, and the molecular weight of B somewhat greater than two times that of A, to achieve useful elastomer mechanical properties. The hard (A) blocks provide virtual crosslinks by forming phase separated domains, or solid, micron-sized aggregates, of a number of polystyrene molecules. These act as rigid anchors or tie points which allow the surrounding soft, extensible polydiene molecules to undergo deformation or movement relative to each other, i.e. be stretched or extended some finite amount under mechanical stress, until the maximum amount of chain unfolding and relative chain movement (strain) has occurred and further movement would require breaking covalent bonds or pulling apart the solid polystyrene domains. The stress at this point is the maximum stress, or strength, possible, before yield or failure. As this stress is released the polydiene chains will tend to return to their starting configurations. The stress/strain properties at a given temperature, say normal ambient temperatures of about 20–25° C., and the degree of retention of these properties upon repeated application of some maximum stress, depend, in addition to the molecular weight parameters already discussed, on the softening and melting properties of the hard block polymer and on the degree of completeness and order of the phase separation of the A and B blocks. As temperature is increased, the stress/strain properties and their retention upon repetition are rapidly depleted.

If some method could be provided to further strengthen, or stabilize, the phase separated hard phase, the stress/strain property would be expected to be enhanced, but especially as the temperature is raised. In particular the loss of stress/strain repeatability (i.e. hysteresis), and the undesirable increase of such properties as compression set, might be greatly reduced. The application of reversible crosslinking to both these classes of elastomers is discussed briefly below. It should be noted and emphasized that A-B-A type block copolymers may be based on a variety of polymer A and polymer B types, so long as the above discussed criteria for hard A block and soft B block properties are met. However, in these thermoplastic block elastomers, the reversible covalent crosslinks should always be provided in the hard A blocks. Furthermore, the crosslink density, when confined to the hard A blocks, may be much higher than that which is normally incorporated in ordinary, or nonblock structure, elastomers, as described earlier above.

Examples of such polymers include, but are not limited to, polyurethanes (i.e. polymers that have urethane backbone connecting bonds) or they may be polymers with other backbone repeating units, such as aliphatic polyesters, acrylic polymers or copolymers, polyolefins (such as ethylene propylene copolymers), styrene butadiene copolymers with about 70 or more weight percent of butadiene content, or polymers containing unsaturation in the backbone such as poly-cis-1,4-polyisoprene or poly-cis-1,4-polybutadiene. If the crosslinks provided in any of these soft polymers are urethane bonds with thermally reversible properties, then the crosslinked polymer products will be elastomers between the lower temperature $T_g$ and the higher reversion onset temperature of the urethane crosslinking bond.

However, if the polymers are of the special block structure type in which a soft, extensible polymer (block B) with a subambient $T_g$ is covalently linked to a hard, high melting polymer (block A), that possess $T_m$'s well above ambient temperature, such that a repeating A-B-A-B-etc. block copolymer structure is obtained, and in which the reversible urethane crosslinks are now provided in the hard blocks (A), rather than the soft blocks (B), thermoplastic elastomers with the added feature of covalent crosslinks between repeat segments of the high melting, or hard block (A) portion, will be obtained. This will result in increases in the tensile and flexural strengths and moduli, and other mechanical properties, of the non-covalently crosslinked thermoplastic elastomers. Of particular importance, these increased mechanical properties will be obtained up to appreciably higher temperatures than in the non-covalently crosslinked thermoplastic elastomers. As a result, large, commercially valuable improvements in the mechanical properties and use temperature ceilings of such covalently crosslinked thermoplastic elastomers can be expected.

Higher levels of reversible urethane crosslinking within polymers are expected to show great utility in terms of mechanical (such as tensile or flexural) strength, rigidity (i.e. very high modulus values), scratch or abrasion resistance, resistance to organic solvents or water at various pH values, and other important properties, when used in practical applications. Some but not all applications include molded parts, composite structures (e.g. elastomers, glass fiber or fabric, carbon fiber or fabric, various particulate filled structures, and the like), coatings on various substrates such as metals, glass reinforced moldings or composites, ceramics, silicon wafers or electronic components, and high structural strength adhesives.

The need exists for new materials having improved melt processing and end use characteristics. The present invention addresses those needs.

BRIEF DESCRIPTION OF THE INVENTION

The invention broadly discloses polymers having thermally reversible crosslinked structures that include one or more urethane bonds made by the reaction of benzylic hydroxyl groups and isocyanate groups. A further embodiment provides for one or more thermally reversible urethane bonds made by the reaction of benzylic hydroxyl groups and isocyanate groups, that are also present in the polymer backbone of individual polymer chains. Typically benzylic alcohol-derived urethane bonds begin to dissociate at a temperature at about or above about 140° C. to about 180° C. These reversion onset temperatures are dependent on the nature and structural environment of the isocyanate groups. When a material containing such reversible urethane linkages is heated to a temperature sufficiently above the reversion onset temperature to cause appreciable urethane group reversion, a readily melt processable material will be formed. These materials when sufficiently above their reversion onset temperature can be readily processed by melt spinning, injection molding, or extrusion processes. When these processed materials are allowed to cool below the reversion onset temperature, the original crosslinks and polymer backbone bonds will reform to provide the benefits of crosslinking previously described.

A further embodiment of the invention includes a polymer described above, wherein the crosslink is represented by the formula:

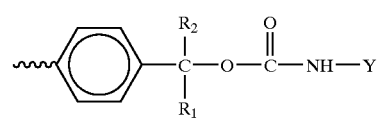

Formula 1 and wherein $R_1$ is H, and $R_2$ represents a group selected from —H and hydrocarbon groups containing up to ten carbon atoms; and Y is an isocyanate residue. Typically the isocyanate residue is selected from the groups containing monoisocyanate, and diisocyanate, triisocyanate functionalities. The isocyanate residue may also typically be selected from the groups containing aromatic monoisocyanate, aromatic, diisocyanate, aromatic triisocyanate, benzylic monoisocyanate, benzylic diisocyanate, benzylic triisocyanate, aliphatic monoisocyanate, aliphatic diisocyanate, aliphatic triisocyanate functionalities, and combinations thereof. Typically the isocyanate residues are those that remain from an original polyisocyanate before they enter into further urethane bond forming reactions. In some typical embodiments, the polymer is a polyurethane and about 0.01 to about 99% of the urethane bonds in the polyurethane are obtained by reaction between a benzylic hydroxyl group and an isocyanate group. In other typical embodiments the polymer is a polyurethane and about 0.1 to about 50% of the urethane bonds in the polyurethane are obtained by reaction between a benzylic hydroxyl group and an isocyanate group. In yet other typical embodiments the polymer is a polyurethane and about 0.1 to about 5% of the urethane bonds in the polyurethane are obtained by reaction between a benzylic hydroxyl group and an isocyanate group.

A yet further embodiment of the invention includes a polymer having a crosslinked structure including a polyol with a high molecular weight; a polyisocyanate; a polyol with a low molecular weight; and trifunctional crosslinking compound selected from the group: (1) a compound having one benzylic hydroxyl group and two aliphatic hydroxyl groups; (2) a compound having two benzylic hydroxyl groups and one aliphatic hydroxyl group; (3) a compound having three benzylic hydroxyl groups; and wherein 0.01 to 99 mol % of bonds in the crosslinks comprise urethane bonds obtained by the reaction between a benzylic hydroxyl group and an isocyanate group. A polymer with a crosslinked structure in one embodiment typically includes a thermoplastic elastomer with a soft block (B) based on the combination of polybutylene adipate and MDI, and a hard block (A) based on the combination of 1,4-butanediol and MDI, in which a compound possessing a benzylic hydroxyl group is included in the hard block (A) as a crosslinker.

A yet further embodiment includes a polymer having crosslinks that include a polyol; a polyisocyanate; a trifunctional crosslinking compound selected from the group: (1) a compound having one benzylic hydroxyl group and two aliphatic hydroxyl groups; (2) a compound having two benzylic hydroxyl groups and one aliphatic hydroxyl group; (3) a compound having three benzylic hydroxyl groups; and wherein 0.01 to 99 mol % of bonds in the crosslinks comprise urethane bonds obtained by the reaction between a benzylic hydroxyl group and an isocyanate group.

A corresponding yet further embodiment includes tetra hydroxylic crosslinking compounds containing from four to one benzylic hydroxyl groups while containing from zero to three aliphatic hydroxyl groups.

An additional embodiment includes a trifunctional hydroxylic compound as represented by the formula:

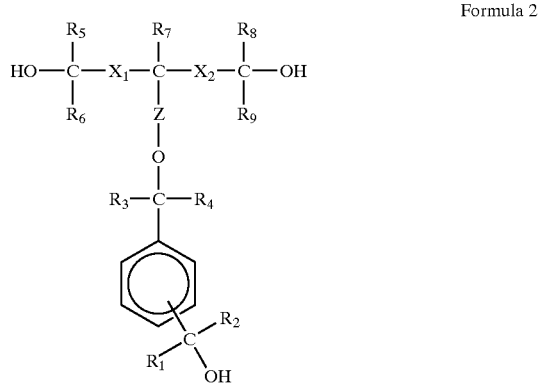

Formula 2 wherein $R_1$ and $R_2$ are identical or different and represent a group selected from —H and hydrocarbon groups containing up to ten carbon atoms; wherein $R_3$ and $R_4$ are identical or different and represent a group selected from —H and hydrocarbon groups containing up to ten carbon atoms; $R_5$ to $R_9$ are identical or different and represent a group selected from hydrogen, methyl, ethyl, or propyl; $X_1$ (left arm), $X_2$ (right arm) and Z may be the same or different and represent none (no additional segment present), methylene, ethylene, or p-phenylene; and the benzylic hydroxyl moiety may be positioned at the para, meta or ortho position.

An additional embodiment includes a compound having a poly-benzylic hydroxyl group capped polymer or oligomer obtained by reacting compounds containing two primary or secondary aliphatic hydroxyl groups and one benzylic hydroxyl group with low molecular weight polyisocyanates in a molar ratio of one primary or secondary aliphatic hydroxyl group per isocyanate group in the polyisocyanate. This selective urethane bond formation is effected by judicious use of temperature control as described in detail below.

Other embodiments include crosslinker compositions consisting of aromatic diisocyanates such as 4,4'-diphenylmethane (MDI); 1,5-naphthalene diisocyanate (NDI); 1,4-phenylene diisocyanate (PDI); 2,4- and 2,6-toluene diisocyanate; benzylic diisocyanates such as TMXDI (1,3-bis{1-isocyanato-1-methylethyl}benzene; tetramethylxylene diisocyanate), p-xylene diisocyanate, and m-xylene diisocyanate; aliphatic diisocyanates such as 1,6-hexamethylene diisocyanate (HDI) and alicyclic diisocyanates such as 1,4-cyclohexane diisocyanate; 4,4'-dicyclohexylmethane diisocyanate; isophorone diisocyanate; and mixtures thereof.

The acronym BD is used in discussions to represent 1,4-butanediol. However, when BD is used in shorthand chemical structures, it means the 1,4-butandiyl group (without hydroxy groups). Similarly IPDI is used in discussions as an acronym for isophorone diisocyanate. However, when IP is used in shorthand chemical structures, it means the isophorone nucleus without its two isocyanate groups. Similarly, TMXDI is used in discussions as an acronym for tetramethylxylene diisocyanate. However, when TMX is used in shorthand chemical structures, it means the tetramethylxylene nucleus without its two isocyanate groups. Another embodiment includes crosslinker compositions consisting of BD capped with IPDI or TMXDI to obtain short oligomeric products described by the formulas:

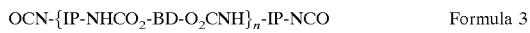

Formula 3 and

Formula 4 where n=1–3, but is predominantly 1 for both formulas 3 and 4, which are useful as a crosslinker of polymers containing pendant benzylic hydroxyl groups.

DETAILED DESCRIPTION OF THE INVENTION AND BEST MODE

Figure 1:
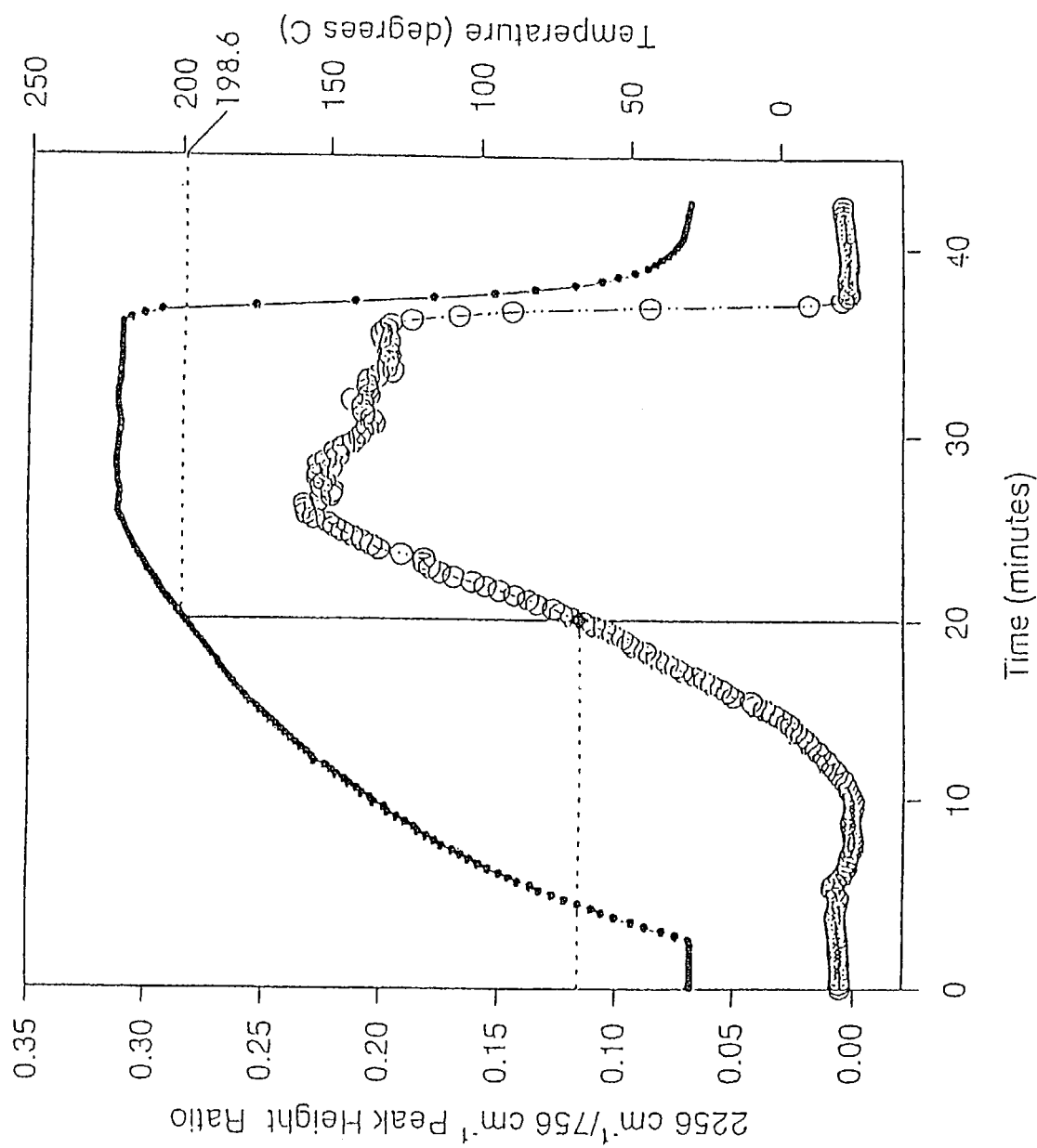
FIG. 1 illustrates isocyanate release from the model compound described as Pair 2 of Table 2 with increasing and decreasing temperature as indicated by variations in the IR band at approximately 2260 cm$^{-1}$ which represents the isocyanate group. This model compound was prepared as described in Example A4.
Figure 2:
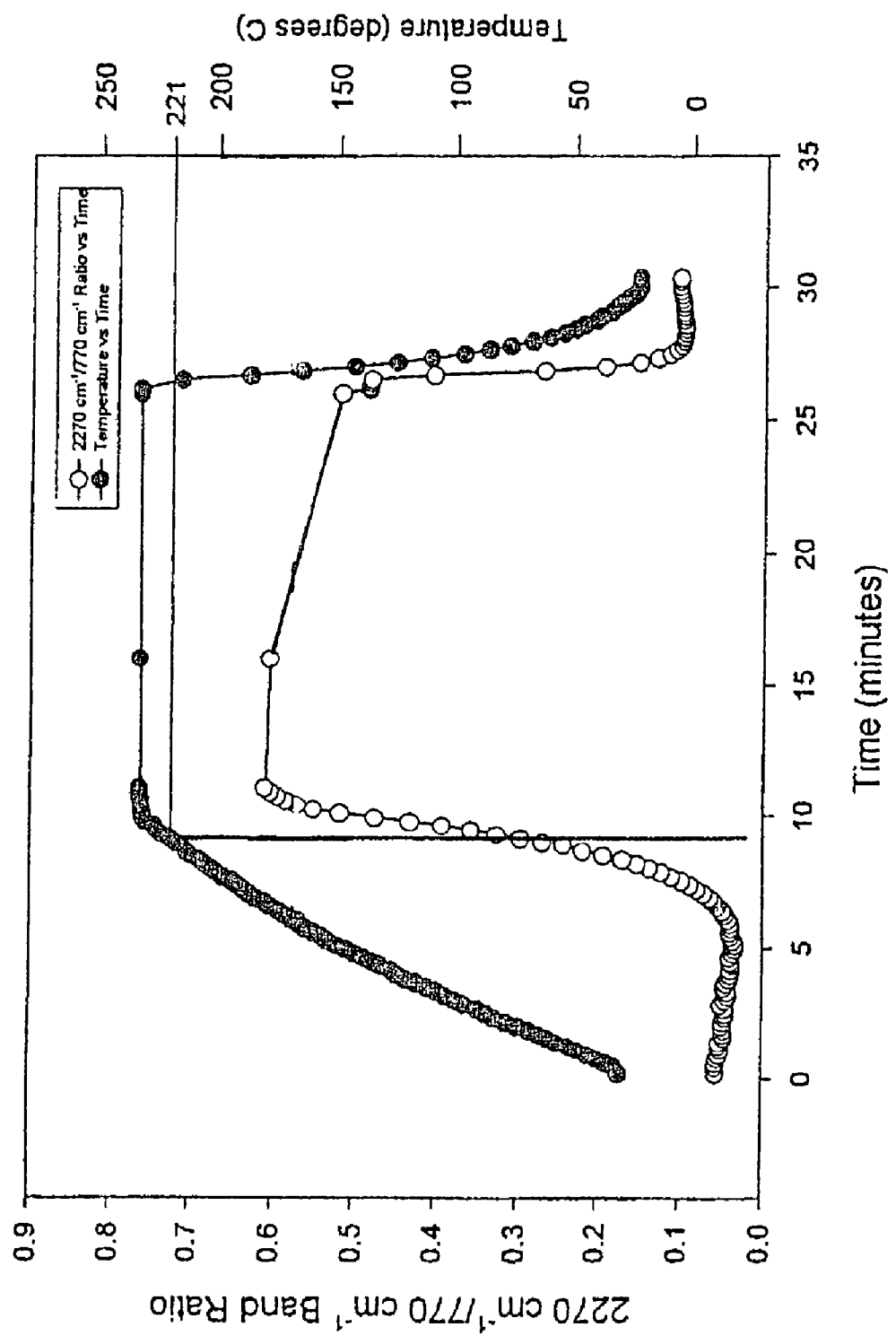
FIG. 2 illustrates isocyanate release from the experimental thermoplastic polyurethane elastomer prepared in Example P3 with increasing and decreasing temperature as indicated by variations in the IR band at approximately 2260 cm$^{-1}$ which represents the isocyanate group.

This invention meets the needs for more versatile polymers by providing thermally reversible polymer compositions having reversible polyurethane linkages in crosslinks between polymer chains or polymer backbones. The number of crosslinks can be controlled so as to obtain polymers with desired properties. The polyurethane crosslinks are based on urethane bonds from benzylic hydroxyl groups and isocyanate groups. New compounds having such groups are also disclosed herein so as to achieve the desired crosslink reversion characteristics.

Broadly the invention discloses new materials and methods for preparing and crosslinking polymers to form polyurethanes, and other polymers not conventionally known as polyurethanes that consist of polymers with added urethane crosslinks, having enhanced properties. One broad embodiment of the invention discloses new crosslinkers useful for obtaining polymers with enhanced properties. Another broad embodiment of the invention discloses new polymers obtained with the new crosslinkers. Other broad embodiments of the invention include methods and processes for preparing the polymers and crosslinkers. Yet another embodiment discloses selective preparation of new oligomeric chain extenders derived from a simple compound type containing either benzylic isocyanate groups or aliphatic isocyanate groups. Yet another embodiment discloses a method to selectively prepare reversible crosslinks comprised of urethane linkages derived from benzylic hydroxyl groups by temperature control.

In a general embodiment, the invention discloses new polymers that contain urethane based crosslinks that start to reversibly dissociate at temperatures at about 140 to about 180° C. so that at higher temperatures one obtains appropriate melt viscosities which readily allow melt preparation of various products such as fibers (by melt spinning), sheets, injection moldings, extruded parts, and coatings.

Another embodiment of the invention also includes a trifunctional hydroxylic crosslinking compound, which contains one to three benzylic hydroxyl functions and none to three primary or secondary aliphatic hydroxyl functions. All hydroxyl functions are either benzylic hydroxyl functions or primary or secondary aliphatic hydroxyl functions.

A further embodiment of the invention includes a tetrafunctional crosslinking compound containing from one to four benzylic hydroxyl groups and from none to three aliphatic and primary or secondary hydroxyl groups. All hydroxyl functions are either benzylic hydroxyl functions or primary or secondary aliphatic hydroxyl functions.

Definitions:

The term "backbone" or "polymer backbone" as used herein indicates the extended linear repeating chain of an oligomer or polymer.

A benzylic hydroxyl group is a hydroxymethyl ($-CR_1R_2OH$) group substituted on a benzene ring, or a benzene ring containing other substituent groups, or other aromatic rings such as naphthalene, anthracene, pyrene, pyridine, pyrazine, or such rings containing other substituent groups where $R_1$ and $R_2$ are identical or different and represent a group selected from —H, aliphatic groups or aromatic groups.

Polyols with a high molecular weight useful according to the teachings of the invention typically have molecular weights at about 1,000 and higher, typically the useful upper limit of the polyols is a molecular weight of about 20,000 and preferably about 10,000. These high molecular weight polyols typically include polyester polyols represented by: Polyethylene butylene sebacate and the like; polybutylene adipate; polycaprolactone diol; aliphatic polycarbonate polyols such as those obtained by transesterification of polyhydroxyl compounds such as 1,4-butanediol; 1,6-hexanediol; 2,2-dimethyl-1,3-propanediol; 1,8-octanediol; and the like; the above reacted with an aryl carbonate, for example, diphenyl carbonate; polyester polycarbonate polyols, for example reaction products of alkylene carbonates and polyester glycols such as polycaprolactone or products obtained by conducting. a reaction of ethylene carbonate with a polyhydric alcohol (such as ethylene glycol, propylene glycol, butylene glycol, neopentyl glycol and the like); and polyether polyols represented by polytetramethylene ether glycol, polypropylene glycol, polyethylenepropylene glycol and the like.

A polyol with a low molecular weight useful with the invention typically has a molecular weight below 1000. Typically the lower limit of molecular weight is about 50. These low molecular weight polyols typically include difunctional compounds as represented by 1,2-ethanediol; 1,3-propanediol; 1,4-butanediol; 1,5-pentanediol; 1,6-hexanediol; 1,8-octanediol; 2,2-dimethyl-1,3-propanediol and the like, and also 1,4-cyclohexanedimethanol; 1,4-bis(beta-hydroxymethoxy) benzene; 1,3-bis-(beta-hydroxyethoxy) benzene; 1,4-bis-(hydroxyethyl) ester of terephthalic acid; 1,3-bis(beta-hydroxyethyl) ester of isophthalic acid, and the like.

Polyisocyanates useful with the invention include: aromatic diisocyanates such as 4,4'-diphenylmethane diisocyanate (MDI); 1,5-naphthalene diisocyanate (NDI); 1,4-phenylene diisocyanate (PDI); 2,4- and 2,6-toluene diisocyanate (commonly available as an 80/20 mixture of 2,4-/2,6-) and the like; benzylic diisocyanates such as TMXDI, p-xylene diisocyanate, m-xylene diisocyanate; aliphatic diisocyanates such as 1,6-hexamethylene diisocyanate (HDI) and alicyclic diisocyanates such as 1,4-cyclohexane diisocyanate; 4,4'-dicyclohexylmethane diisocyanate; isophorone diisocyanate; and the like. Isocyanates with more than two isocyanate groups per molecule are also available and include the trimerized products of the simple diisocyanates listed above in which three isocyanate groups are symmetrically located on an isocyanurate. nucleus, these are exemplified herein by the HDI Trimer (Tolonate®HDI) from Rhone Poulenc. There are also polyisocyanates with varying functionality greater than 2 from Upjohn and other companies, such as Isonate 143L and the PAPI series.

Typically, the difunctional benzylic hydroxyl compounds are used in the polymer backbone to obtain special properties. Typically, the trifunctional and tetrafunctional benzylic hydroxyl compounds may be used both in the backbone of the polymer chains and in the crosslinks between backbone or polymer chains. Useful difunctional benzylic hydroxyl compounds include: those in the benzene series represented by 1,4-benzenedimethanol, 1,3-benzene-dimethanol; and 1,2-benzenedimethanol; those in the pyridine series represented by 2,6-bis(hydroxymethyl)pyridine; those in the pyrazine series represented by 2,5-bis(hydroxymethyl)pyrazine; 2,3-bis(hydroxymethyl)pyrazine; and 2,6-bis(hydroxymethyl)pyrazine. Useful trifunctional benzylic hydroxyl compounds include those having one benzylic hydroxyl group and two primary or secondary aliphatic groups represented by Compound 1 and its analogues; those having three benzylic hydroxyl groups represented by 1,2,4-benzenetrimethanol; and 1,3,5-benzenetrimethanol. Useful tetrafunctional benzylic hydroxyl compounds include those having four benzylic hydroxyl groups represented by 1,2,4,5,-tetra(hydroxymethyl)benzene New compounds having a benzylic hydroxyl group useful for forming urethane and ester linkages are represented by Formula 2, wherein $R_1$ and $R_2$ are identical or different and represent a group selected from —H and hydrocarbon groups containing up to ten carbon atoms; wherein $R_3$ and $R_4$ are identical or different and represent a group selected from —H and hydrocarbon groups containing up to ten carbon atoms; $R_5$ to $R_9$ are identical or different and represent a group selected from hydrogen, methyl, ethyl, or propyl; $X_1$ (left arm), $X_2$ (right arm) and Z may be the same or different and represent none (no additional segment present), methylene, ethylene, or p-phenylene; and the benzylic hydroxyl moiety may be positioned at the para, meta or ortho position. Another embodiment includes the use of the above compounds to crosslink polymer chains (e.g. ester linkages, urethane linkages). In a preferred embodiment the compound is: 2-{[(4-hydroxymethyl)benzyl]oxy}-1,3-propanediol (Compound 1). With Compound 1, another embodiment includes its use to crosslink polymer chains through ester or urethane linkages.

Particularly useful benzylic hydroxyl compounds for making reversible urethane bonds according to the present invention are represented by the Formula 2: wherein $R_1$ is H, and $R_2$ represents a group selected from —H and hydrocarbon groups containing up to ten carbon atoms; $R_3$ and $R_4$ are identical or different and represent a group selected from —H and hydrocarbon groups containing up to ten carbon atoms; $R_5$, $R_7$ and $R_8$ are identical or different and represent hydrogen, methyl, ethyl, or propyl; $R_6$ and $R_9$ is hydrogen; X and Z may be the same or different and represent none (no additional group or segment present), methylene, ethylene, or p-phenylene; the benzylic hydroxyl moiety may be any isomer in the para, meta or ortho position. Preferably the hydrocarbon groups of $R_2$ through $R_4$ contain no more than five carbon atoms and the benzylic hydroxyl moiety may be positioned in the ortho or para position, most preferably the para position. In a preferred embodiment the compound is 2-{[(4-hydroxymethyl)benzyl]oxy}-1,3-propanediol (Compound 1). With Compound 1, another embodiment includes its use to crosslink polymer chains through ester or urethane linkages).

These benzylic hydroxyl compounds have three functional groups, a reversible benzylic hydroxyl group available for crosslinking and two reversible primary or secondary aliphatic groups available for incorporation into the polymer backbone. These compounds owe their unique usefulness to the fact that urethane linkages formed by their benzylic hydroxyl groups are more readily reversible, or reverse at lower temperatures, than urethane linkages utilizing aliphatic primary or secondary hydroxyl groups.

A polyisocyanate useful with the invention typically includes diisocyantes and other higher polyisocyanates. Diisocyanates are represented by isophorone diisocyanate (IPDI), TMXDI, phenylenediisocyanate (PDI), toluenediisocyanate (TDI), hexanediisocyanate (HDI); methylene-diphenyl-diisocyanate (MDI), naphthalene diisocyanate (NDI), and others disclosed in U.S. Pat. No. 4,608,418 to Czerwinski et al, which is hereby incorporated by reference. Additional useful isocyanates are disclosed in U.S. Pat. No. 5,097,010 to Markle et al, which is hereby incorporated by reference.

Diols useful for making crosslinkers containing benzylic hydroxyl groups according to the invention include 1,2-ethanediol; propanediols represented by 1,2-propanediol or 1,3-propanediol; butanediols represented by 1,3-butanediol or 1,4,-butanediol; pentanediols represented by 1,5-pentanediol; hexanediols represented by 1,6-hexanediol; and the like.

Triols useful for making crosslinkers containing benzylic hydroxyl groups according to the invention include 1,2,3-propanetriol (glycerin), 1,2,3- or 1,2,4-trihydroxybutane, and higher aliphatic triols where at least two of the hydroxyls are on carbon atoms separated by one carbon atom.

Preferred crosslinking compounds containing benzylic hydroxyl groups useful with the invention typically include a tetrafunctional hydroxyl crosslinking compound containing from one to four benzylic hydroxyl groups and from none to three aliphatic, primary and secondary hydroxyl groups, and a trifunctional crosslinking compound containing from one to three benzylic hydroxyl groups and from none to two aliphatic, primary and secondary hydroxyl groups. A typical and preferred benzylic hydroxyl crosslinking compound is 2-{[(4-hydroxymethyl)benzyl]oxy}-1,3-propanediol (Compound 1).

Low to high crosslinking levels, may be obtained as desired. The crosslinking density, may range from about one reversible crosslink per 100 to 200 or more polymer backbone repeat units, to one crosslink per 3 to 5 backbone repeat units. Example P3, below, illustrates a degree of benzyl hydroxyl crosslinking to total hydroxyl content of 1:165 in the example P3. This material was quite acceptable in terms of properties, however, higher or lower degrees of crosslinking will provide additional useful properties or characteristics.

Selective Urethane Formation by Temperature Control

A broad embodiment using temperature control includes a method of selectively forming specific type urethanes when three different types of hydroxyl groups are reacted with isocyanate groups, wherein the three types of hydroxyl groups are labeled H(1), H(2), and H(3) and a urethane bond is formed from these three hydroxyl groups with isocyanate groups, labeled I(1), I(2), and I(3) {where I(1), I(2), and I(3) may be the same or different}. The resultant urethane bonds are designated H(1)-I(1), H(2)-I(2), and H(3)-I(3), respectively. Typically the hydroxyl groups and isocyanate groups are selected so that urethane bond H(1)-I(1) has a reversion onset temperature lower than that of urethane bond H(2)-I(2); and likewise urethane bond H(2)-I(2) has a reversion onset temperature lower than that of urethane bond H(3)-I(3).

Urethane bond H(3)-I(3) can be selectively formed by heating a mixture containing components H(1), H(2), H(3), and I(3), wherein only sufficient I(3) is added to react with the amount of H(3) present, at a temperature above the reversion onset temperature of urethane bond H(1)-I(1) and H(2)-I2), and slightly below, about at or slightly above the higher reversion onset temperature of urethane bond H(3)-I(3), up to a combination of temperatures and heating times where unacceptable degradation takes place, the reaction is maintained for a sufficiently long time period to achieve the desired urethane formation reaction. Typically the upper temperature limit for H(3)-I(3) reactions may be achieved at ±20% of the reversion onset temperature of H(3)-I(3), or more preferably at ±10%. In this and subsequent reactions, the temperature of the reaction mixture must be maintained above the melt temperature of the reaction mixture including and the resulting polymer; however, in between reaction steps the temperature may be lowered to any desired, including for example ambient temperatures, as long as the reaction mixture is reheated to the aforementioned reaction temperature for the urethane reaction to occur. After formation of urethane bond H(3)-I(3), additional isocyanate I(2) is added in quantities sufficient to react with the amount of H(2) present. For the second reaction, the temperature may be changed to be between about ±10% of the onset reversal temperature of H(3)-I(3) to a lower limit of about ±20% of the reversion onset temperature of H(2)-I(2), or more preferably within about ±10% of the reversion onset temperature of H(2)-I(2), while maintaining the reaction above the melt temperature of the mixture and the resulting product. The reaction is maintained for a sufficiently long time period to achieve the desired urethane formation reaction of H(2)-I(2).

After formation of urethane bond H(2)-I(2), additional isocyanate I(1) is added in quantities sufficient to react with the amount of H(1) present. For the third reaction, the temperature may be changed to be between about ±20% of the onset reversal temperature of H(2)-I(2) to a lower limit of about ±20% of the reversion onset temperature of H(1)-I(1), while maintaining mixture above the melt temperature of the mixture and the resulting product. The reaction is maintained for a sufficiently long time period to achieve the desired urethane formation reaction of H(1)-I(1). In the above broad embodiment hydroxyl groups that are typically used are aliphatic hydroxyl groups, benzylic hydroxyl groups, and phenolic hydroxyl groups. In further embodiments the hydroxyl groups H(3) are typically derived from aliphatic hydroxyl groups typified by 1,4-BD, polybutylene adipate and the like and the isocyanates I(3) from aryl isocyanates such as MDI. This combination gives a reversion onset temperature for H(3)-I(3) of about 200° C. In a further embodiment the hydroxyl groups H(2) are typically benzylic hydroxyl groups typified by Formula 2 and Compound 1 and the like; while I(2) isocyanates are typically cycloaliphatic typified by IPDI-NCO and the like, or aromatic such as TMXDI-NCO and the like, giving H(2)-I(2) onset reversion temperatures of 150° C. and 140° C. respectively. Still further embodiments for the hydroxyl groups H(1) are typically phenolic hydroxyl groups typified by PHBA-OH and the like; while the isocyanates are typified by cycloaliphatic IPDI-NCO and the like, resulting in H(1)-I(1) reversion onset temperatures of about 105° C.

Another embodiment using temperature control includes a method of selectively forming specific types of urethanes when only two different types of hydroxyl groups are reacted with isocyanate groups, wherein the two types of hydroxyl groups are labeled H(1), and H(2), and a urethane bond is formed from these two hydroxyl groups with isocyanate groups, labeled I(1) and I(2), {where I(1) and I(2) may be the same or different}. The resultant urethane bonds are designated H(1)-I(1) and H(2)-I(2), respectively. Typically the hydroxyl groups and isocyanate groups are selected so that urethane bond H(1)-I(1) has a reversion onset temperature lower than that of urethane bond H(2)-I(2).

Urethane bond H(2)-I(2) can be selectively formed by heating a mixture containing components H(1) and H(2), and I(2), wherein only sufficient I(2) is added to react with the amount of H(2) present, at a temperature above the reversion onset temperature of urethane bond H(1)-I(1), and typically about at or slightly above or slightly below the higher reversion onset temperature of urethane bond H(2)-I(2), up to a combination of temperatures and heating times where unacceptable degradation takes place, the reaction is maintained for a sufficiently long time period to achieve the desired urethane formation reaction. Typically the upper temperature for H(2)-I(2) reactions may be achieved at ±20% of the reversion onset temperature of H(2)-I(2), or more preferably at ±10%. In this and subsequent reactions, the temperature of the reaction mixture must be maintained above the melt temperature of the reaction mixture including and the resulting polymer; however, in between reaction steps the temperature may be lowered to any desired, including for example ambient temperatures, as long as the reaction mixture is reheated to the aforementioned temperature for the urethane reaction to occur. After formation of urethane bond H(2)-I(2), additional isocyanate I(1) is added in quantities sufficient to react with the amount of H(1) present. For the second reaction, the temperature may be changed to be between about ±10% of the onset reversal temperature of H(2)-I(2) to a lower limit of about ±20% of the reversion onset temperature of H(1)-I(1), or more preferably within about ± 10% of the reversion onset temperature of H(1)-I(1), while maintaining the reaction above the melt temperature of the mixture and the resulting product. The reaction is maintained for a sufficiently long time period to achieve the desired urethane formation reaction of H(1)-I(1). The above two component system is typified by the examples herein. In further embodiments the hydroxyl groups H(2) are typically derived from aliphatic hydroxyl groups typified by 1,4-BD, polybutylene adipate and the like and the isocyanates I(2) from aryl isocyanates such as MDI. This combination gives a reversion onset temperature for H(2)-I(2) of about 200° C. In a further embodiment the hydroxyl groups H(1) are typically benzylic hydroxyl groups typified by Formula 2 and Compound 1 and the like; while I(1) isocyanates are typically cycloaliphatic typified by IPDI-NCO and the like, or aromatic such as TMXDI-NCO and the like, giving H(2)-I(2) onset reversion temperatures of 150° C. and 140° C. respectively. In typical embodiments for the two hydroxyl group system described above the following hydroxyl pairings are useful: aliphatic/benzylic, aliphatic/phenolic, and benzylic/phenolic.

The above described embodiments illustrate selective urethane bond formation and is termed selective urethane bond formation via temperature control. As is apparent from the teachings herein, the principle of temperature control, demonstrated for benzylic hydroxyl groups and aliphatic hydroxyl groups in the examples below, can easily be extended to the case where the crosslinking compound contains one or more phenolic groups and two or more aliphatic alcohol groups, and the case when the crosslink compound contains one or more phenolic groups and two or more benzylic alcohol groups.

Example P3, below, shows that sufficiently high urethane reversion (in crosslinks) was achieved at 200° C. to allow facile processing of a polymer (a thermoplastic polyurethane elastomer) containing crosslinks comprised of urethane bonds derived from benzylic alcohols. This behavior was attained using Compound 1 as a crosslinking compound having three functional groups, including a benzylic hydroxyl group available for thermally reversible crosslinking and two primary aliphatic hydroxyl groups available for incorporation into the polymer backbone. It was surprisingly found (see Example P2, below) that Compound 1 would polymerize with a diisocyanate by selectively forming relatively thermally stable urethane bonds via the two primary aliphatic hydroxyl groups, while leaving the pendant benzylic hydroxyl group unreacted, by selective urethane formation via temperature control.

The non-crosslinked thermoplastic polyurethane elastomer prepared in example P2, below, contained urethane linkage derived from an aryl isocyanate (MDI) and aliphatic diols (polybutylene adipate, BD and Compound 1). As seen in Table 1, the urethane reversion onset temperature of this type linkage is approximately 200° C. as reported in the literature. The IR spectroscopy-determined urethane reversion onset temperature of a commercial non-crosslinked thermoplastic polyurethane elastomer containing urethane linkages derived from MDI and the aliphatic diols polybutylene adipate and BD is approximately 180° C. as found in the tests herein. These urethane reversion onset temperatures are significantly higher than the IR spectroscopy-determined reversion onset temperature of 140° C. determined for urethanes derived from an aryl isocyanate (TMXDI) and a benzylic alcohol Table 2).

The following examples are merely exemplary and illustrative of the invention and are not meant to limit the invention in any way.

Preliminary Tests

In order to identify more specific types of isocyanate groups and alcohol or phenol groups, which might be expected to provide practical processing and end use characteristics, preliminary work was performed using model compounds. These model compounds were based on the benzylic hydroxyl group defined earlier, as represented by p-(hydroxymethyl)benzoic acid (HMB), the phenol group as represented by p-hydroxybenzoic acid (PHBA), the cycloaliphatic and aliphatic isocyanate groups of isophoronediisocyanate (IPDI) and the tertiary benzylic isocyanate groups of TMXDI. Three pairings were used in IR determinations of reversion onset temperatures (Pair 1, Pair 2, and Pair 3). When PHBA is shown in shorthand chemical structures it can also be represented by HO-PHBA-$CO_2$H.

Pair 1. Phenolic-OH; PHBA-OH (from PHBA esterified with BD to give primarily non-volatile HO-PHBA-$CO_2$-BD-$O_2$C-PHBA-OH with terminal phenolic groups: Example A1) and IPDI-NCO (from a nonvolatile primarily OCN-IP-NHCO$_2$-BD-OCONH-IP-NCO product with terminal NCO groups formed from the reaction of BD with excess IPDI; Example C1).

Pair 2. Benzylic-OH [from 4-hydroxymethylbenzoic acid (HMB) esterified with 1-octadecanol to give nonvolatile octadecyl 4-(hydroxymethyl) benzoate (HMB-C18 alcohol) with terminal benzylic alcohol groups; Example A2) and IPDI-NCO (Example C1 described above).

Pair 3. Benzylic-OH (Example A2 described above) and TMXDI-NCO (from a non-volatile OCN-TMX-NHCO$_2$-BD-OCONH-TMX-NCO product with terminal NCO groups formed by the reaction of BD with excess TMXDI; Example C2).

The preparation of the HO-PHBA-$CO_2$-BD-$O_2$C-PHBA-OH and HMB-C18 hydroxyl terminated products is described in Example A1 and Example A2, respectively. The preparation of Pair 1 and Pair 2 products, described above, for infrared spectroscopic interrogation as a function of temperature, to determine the reversion onset temperature and the reversion midpoint temperature are described in Example A3 and A4, respectively.

IR analyses were performed in the transmission mode using a Digilab FTS-60A, FT-spectrometer at 4 cm$^{-1}$ resolution. Samples, prepared as described in Example A3 and Example A4, were placed in the sample holder, between two 2 mm thick KBr salt plates. The IR samples were estimated to be about 0.1 mm thick. The sample holder was custom made by Harrick and is equipped with a resistance heater and coolant circulation connections for cooling the cell. The cell was heated and cooled with Therminol 59, a heat transfer fluid. For the IR measurements, the sample was heated from room temperature to 230° C. (~5° C./min) and then cooled to room temperature (~82° C./min). After data collection, the peak intensities of the isocyanate band (approximately 2260 cm$^{-1}$), and aromatic substitution absorption bands (700–760 cm$^{-1}$) were measured and this ratio was then plotted versus the temperatures. The isocyanate/aromatic substitution absorption ratio was used to compensate for the potential change in sample thickness during the temperature increases and decreases.

The first heatup of some samples from room temperature to 230° C. showed isocyanate absorptions already present even at room temperature, before heatup was started. This was presumed to be due to incomplete reaction of the NCO—OH pairs. However, after this first heating and cooling cycle, the room temperature isocyanate absorption at approximately 2260 cm$^{-1}$ was gone, indicating that the reaction was completed.

The IR analysis of Pair 1, Pair 2, and Pair 3 indicated approximate reversion onset temperatures of 105° C., 150° C., and 140° C., respectively (Table 2). The measured onset temperatures of approximately 105° C. for a phenolic hydroxyl-aliphatic isocyanate derived urethane linkage indicates that these materials can be melt-processed above 105° C., at temperatures at which sufficiently high percent urethane dissociation will occur, but materials incorporating these type urethane linkages can lose mechanical and tensile behavior at temperatures significantly above this threshold temperature. These results also indicate that benzylic hydroxyl groups formed a urethane bond of higher thermal stability than the phenolic group. The reversion onset temperatures of the benzylic alcohol-derived urethanes (Pairs 2 and 3) indicates the potential for melt processability above 140° C.–150° C. and at higher temperatures at which sufficiently high percent dissociation of these type urethane bonds occurs.

TABLE 2

Approximate Reversion Onset Temperatures

| Pairs | Poly-Isocyanate | Alcohol or Phenol | Urethane Types | Approximate Reversion Onset Temp. ° C. |
|---|---|---|---|---|
| 1 | IPDI-NCO[a] | PHBA-OH[b] (phenolic) | Cycloaliphatic Isocyanate - Phenolic | 105 |
| 2 | IPDI-NCO[a] | HMB-C18[c] (benzylic-alcohol) | Cycloaliphatic Isocyanate - Benzylic Alcohol | 150 |
| 3 | TMXDI-NCO[d] | HMB-C18[c] (benzylic-alcohol) | Aromatic Substituted Tertiary Isocyanate - Benzylic Alcohol | 140 |

Notes:
[a]IPDI-NCO is a shorthand acronym for
OCN—IP—NHCO$_2$—BD—OCONH—IP—NCO
[b]PHBA-OH is a shorthand acronym for
HO—PHBA—CO$_2$—BD—O$_2$C—PHBA—OH
[c]HMB-C18 is a shorthand acronym for the product of HMB esterified with 1-octadecanol to give nonvolatile octadecyl 4-(hydroxymethyl)benzoate with terminal benzylic alcohol groups
[d]TMXDI-NCO is a shorthand acronym for
OCN—TMX—NHCO$_2$—BD—OCONH—TMX—NCO formed by the reaction of BD with excess TMXDI

EXAMPLE A1

This example illustrates the preparation of PHBA-OH used in Pair 1 of Table 2. Initially, p-hydroxybenzoic acid (PHBA, Aldrich H2,005-9, used as received) (60 g, 0.435 mole) and 1,4-butanediol (BD, Aldrich 24,055-9, vacuum distilled) (19.5 g, 0.217 mole) were added to a round bottom flask fitted with a refluxing condenser. The contents were heated to 260° C. for two hours. The water produced from the reaction was removed with a constant flow of nitrogen over the reaction mixture. To remove phenol that was formed as a byproduct by decarboxylation of PHBA, the oligoester was extracted with methanol and the methanol insoluble PHBA-OH portion was isolated. This material, which was analyzed by $^1$H NMR spectroscopy and found not to contain phenol, was used in the model compound reversion studies.

EXAMPLE A2

This example illustrates the preparation of HMB-C18 (molecular weight 404.7) used in Pair 2 of Table 2. Initially, 4-(hydroxymethyl)benzoic acid (HMB) (6 g, 0.039 mole) and n-octadecanol (C18)(10.67 g, 0.039 mole) were added to a round bottom flask fitted with a refluxing condenser. The contents were heated to 260° C. for two hours. The water produced from the reaction was removed with a constant flow of nitrogen. After the reaction, the HMB-C18 crude product was dissolved in 10 ml acetone and reprecipitated from 100 ml of methanol to remove the unreacted HMB. The $^1$H NMR spectroscopy of this product indicated 20 mole percent of unreacted n-octadecanol. The unreacted n-octadecanol was removed by dissolving the HMB-C18 in methylene chloride and precipitating from hexane, which is a solvent for 1-octadecanol, before it was used model compound reversion studies (see Table 2).

EXAMPLE A3

This example illustrates the combination of IPDI-NCO AND PHBA-OH to produce the Pair 1 reaction product. The isocyanate IPDI-NCO (product of Example C1; 0.500 g; 3.03 meq isocyanate groups) and the phenolic PHBA-OH (product of Example A1; 0.810 g; 3.03 meq hydroxyl groups) were weighted into a dry test tube so equal molar amounts of —NCO and —OH groups were present. This mixture was then heated to 160° C. under a blanket of argon with the test tube immersed in a heated Wood's metal bath. The reaction mixture was maintained at 160° C. for about 20 minutes with intermittent stirring under an argon gas purge. After the reaction, a thin film was prepared from this material by pressing at about 180° C.–190° C. between 10 mil sheets of Teflon™ on a surface temperature controlled hot plate. A portion of the film was then analyzed by IR spectroscopy in a cell capable of being heated to 230° C., which indicated residual isocyanate in the IR spectrum at room temperature. However, urethane formation was driven to completion by heating rapidly from room temperature to 230° C., and then cooling back to ambient temperature. The IR spectrum at the end of cycle one showed that no free isocyanate remained. Hence, the IR spectrum for cycle 2 was used to measure reversion onset temperature and reversion midpoint temperature (see FIG. 1).

EXAMPLE A4

This example illustrates the combination of IPDI-NCO and HMB-C18 to produce Pair 2 reaction product. The isocyanate IPDI-NCO (product of Example C1, 0.249 gm, 0.000931 eq. NCO) and the benzylic hydroxyl intermediate HMB-C18 (product of Example A2, 0.377 gm, 0.000932 eq. OH) were weighed into a dry test tube so equal molar amounts of —NCO and —OH groups were present. This mixture was then heated to 200° C. under a blanket of argon with the test tube immersed in a Woods metal bath. The reaction mixture was maintained at 190° C. for about 5 minutes then at 165° C. for 20 minutes, with intermittent stirring under an argon gas purge. After the reaction, a thin film was prepared from this material by pressing at about 180–190° C. between 10 mil sheets of Teflon™ on a surface temperature-controlled hot plate. A portion of the clear, very brittle film product was then analyzed by IR spectroscopy in a cell capable of being heated to 230° C., which indicated residual isocyanate in the IR spectrum at room temperature. However, urethane formation was driven to completion by heating rapidly from room temperature to 230° C. and then cooling back to ambient temperature. The IR spectrum at the end of one cycle showed that no free isocyanate remained. Hence, the IR spectrum for cycle 2 was used to measure reversion onset temperature and reversion midpoint temperature (see FIG. 1).

EXAMPLE B1

This example illustrates a method for the preparation of a typical benzylic hydroxyl crosslinker useful with the invention. The method produces a trifunctional crosslinking compound containing one benzylic hydroxyl group and two aliphatic and primary hydroxyl groups (2-{[(4-hydroxymethyl)-benzyl]oxy}-1,3-propanediol—labeled as Compound 1). Compound 1 was synthesized for incorporation into the backbone of polyurethanes by using its aliphatic hydroxyl groups while leaving its benzylic hydroxyl group available to form reversible urethane-based crosslinks using selective urethane bond formation based on temperature control. Intermediate E was prepared to determine if blocking of the benzylic hydroxyl group by a readily removable blocking group (a methoxyacetic acid ester) in Compound 1 was necessary to allow its selective incorporation into the urethane backbone involving aliphatic hydroxyl groups only. However, it was shown that Compound 1 (not containing a blocking group) underwent selective initial urethane formation involving the aliphatic hydroxyl groups without involving its benzylic hydroxyl groups by the judicious use of temperature control (discussed earlier). It was also shown that deblocking of Intermediate E which had been incorporated in a linear polyurethane with methanolic ammonia led to significant urethane cleavage as determined by gel permeation chromatography (GPC). Thus, the preferred method of incorporating Compound 1 in a polyurethane for subsequent crosslinking purposes is by selective urethane formation by temperature control and not by use of blocking groups.

The principle of temperature control could easily be extended to the case where the crosslinking compound contains one or more phenolic groups and two or more aliphatic alcohol groups, and the case when the crosslink compound contains one or more phenolic groups and two or more benzylic alcohol groups.

The synthetic route that was developed and described below, involves the initial synthesis of Intermediate E, which was then deblocked to form Compound 1 before incorporation into a polymer as a crosslinker.

Preparation of Intermediate A

Intermediate A is composed of two isomers and this mixture is named as follows by IUPAC: cis- and trans-2-phenyl-1,3-dioxan-5-ol.

A one liter, three neck, round bottom flask was equipped with a Barrett tube attached to a reflux condenser which was attached to an argon inlet via a mineral oil bubbler. This flask, which contained a magnetic stir bar and was positioned in a heating mantle, was flushed with argon and then charged with 200 ml of benzene, 160.0 g (1.51 moles) of benzaldehyde, 150.0 g (1.63 moles) of glycerin and 1.00 g of p-toluenesulfonic acid monohydrate. A blanket of argon was kept over the flask during the reaction period. The reaction mixture was refluxed until close to the theoretical amount of water had collected in the Barrett tube and transferred to a one-liter separatory funnel. One hundred ml of 0.1M sodium hydroxide was added to achieve pH 9–10 and the mixture was extracted with 350 ml of diethyl ether. The ether extract was first treated with a saturated solution of sodium hydrosulfite (32.75 g/100 ml water) causing the formation of some solid in the ether layer, then washed with water (150 ml), followed by a 5% sodium bicarbonate (100 ml) treatment. After a water wash (2×150 ml), the ethereal layer was dried over sodium sulfate overnight. The solvent was stripped on a rotating evaporator (bath at 30° C.) to obtain 199.70 g of liquid. This material was dissolved in 400 ml low boiling petroleum ether and refrigerated to give a solid which weighed 186.28 g after filtration and drying under vacuum. Since proton NMR analysis indicated that a significant amount of benzaldehyde was still present, this material was dissolved in diethyl ether (800 ml) and washed with 2×125 ml of sodium hydrosulfite (61.0 g in 200 ml water). The white solid that formed during this period was dissolved by the addition of 100 ml of water. The ether layer was washed with 5×120 ml water (pH 2), passed through cotton, dried over sodium sulfate overnight, and then stripped to obtain a yellow-orange liquid (139.1 g). This material produces a low melting solid when placed in a refrigerator. When brought to ambient temperature, the liquid phase was decanted and the remaining solid was dissolved in a total of 400 ml of dry toluene at room temperature. After addition of 400 ml of hexane, a copious amount of white solid precipitated at room temperature. After this mixture was placed in a refrigerator overnight, a fine white solid was filtered and dried which weighed 74.33 g (27.4% yield).

Sodium bisulfite can also be used to advantage in removing unreacted benzaldehyde. The procedure for this reaction is found in: C. Piantadosi, C. E. Anderson, E. A. Brecht and C. L. Yarbro, J. Am. Chem. Soc., 80, 6613–6617 (1958).

The proton and carbon-13 nuclear magnetic resonance (NMR) spectra of this material indicated that it was a mixture of cis- and trans-1,3-benzylidene glycerin and that 1,2-benzylidene glycerin had been completely removed by recrystallization.

Preparation of Intermediate B

Intermediate B is composed of two isomers and this mixture is named as follows by IUPAC: cis- and trans-5-{[4-bromomethyl)benzyl]oxy}-2-phenyl-1,3-dioxane.

A two liter, three neck, round bottom flask equipped with an argon inlet and mechanical stirrer was first flushed with argon and then charged with 1167 ml dimethylsulfoxide (dried over molecular sieves) and 26.10 g powdered potassium hydroxide (0.466 moles). This mixture was stirred for five minutes and then 21.00 g 1,3-benzylidene glycerin (0.1165 moles) was added followed by addition (all at once) of 92.26 g α,α'-dibromo-p-xylene (0.3495 moles). The lemon yellow reaction mixture was stirred while maintaining it under an argon blanket (via a mineral oil bubbler) for an additional eighty minutes at ambient temperature.

The reaction mixture was then added to a six-liter separatory funnel containing 250 g of ice and 2250 ml of water and considerable yellow solid formed at this point. The aqueous layer was extracted with methylene chloride (a 2000 ml portion followed by 2×1300 ml portions). The combined organic layers were split in half, filtered through cotton to remove the yellow solid, and each half was washed with 3×1800 ml water. The methylene chloride was passed through a cotton plug and dried over sodium sulfate. The solvent was stripped on a rotating evaporator and the resulting solid was dried in a vacuum oven with phosphorous pentoxide to obtain 88.50 g yellow solid. The excess α,α'-dibromo-p-xylene was removed by sublimation and the residue was used directly to prepare Intermediate C (see below). To illustrate, one sublimation was performed with 52.43 g crude Intermediate B in a large sublimation chamber requiring dry ice within the cold finger. This apparatus was maintained at 0.035 Torr and 80° C. in a controlled temperature oil bath for a total of 47.5 hours until minimal further sublimate was formed. The residue (non-sublimed material) weighed 13.83 g (26.4% of the starting weight).

The proton NMR spectrum of this material indicated the presence of both trans- and cis-Intermediate B. Preparative scale High Performance Liquid Chromatography (HPLC) was used to fractionate this mixture (using a normal phase HPLC column with tetrahydrofuran (THF)/isooctane (15:85)) to obtain these isomers in a pure state whose structures were confirmed by proton NMR spectroscopy and gas chromatography/mass spectroscopy (GC/MS) (in the electron impact mode).

Preparation of Intermediate C

Intermediate C is composed of two isomers and this mixture is named as follows by IUPAC: cis- and trans-4-{[(2-phenyl-1,3-dioxan-5-yl)oxy]methyl}benzyl methoxyacetate.

Potassium methoxyacetate was prepared by dissolving 52.47 g methoxyacetic acid (0.5800 moles) in 150 ml of distilled water in an Erlenmeyer flask and initially adding 32.50 g potassium hydroxide (nominally 0.580 moles). Addition of 2 drops of a 1% ethanolic phenolphthalein solution indicated that the end point had not been reached, so this solution was titrated with a 10% aqueous solution of potassium hydroxide until a pink color persisted. This solution was freeze dried and dried further in a vacuum oven, in the presence of phosphorous pentoxide, to yield 71.94 g of a white solid.

A 300 ml, three neck, round bottom flask containing a magnetic stir bar and equipped with a reflux condenser and gas inlet tube was positioned in a heating mantle and flushed with argon. This flask was maintained under an argon blanket using a bubbler filled with mineral oil. The flask was charged with 0.9147 g 18-crown-6 (3.461 mmoles) and 134 ml acetonitrile was transferred from an anhydrous source using syringe techniques. Potassium methoxyacetate (18.85 g; 0.1471 moles) was added and the milky white suspension was stirred at ambient temperature for 50 minutes to allow coordination of the 18-crown-6 with the potassium ion. Crude Intermediate B (26.75 g and 0.07364 moles) was added and the yellow mixture was refluxed for 110 minutes. After cooling slightly, the mixture was filtered through a Buchner funnel (Whatman #1 paper) and the filter cake was washed with 4×50 ml acetonitrile and then with 3×50 ml benzene. This washing was performed to remove residual Intermediate C from the filter cake. The filtrate was stripped on a rotating evaporator and the resulting material was placed in a vacuum oven containing phosphorous pentoxide to obtain 29.15 g of a brown solid.

Column chromatography was used to purify Intermediate C. A column having an internal diameter of approximately 7.5 cm was filled with 292 g of silica gel slurried in excess benzene. Crude Intermediate C (29.15 g) was dissolved in 155 ml of benzene and applied to this column using benzene as the eluent. A total of 19 fractions were collected ranging in size from 125 ml to 250 ml for fractions 1–7 and 300 ml to 500 ml for fractions 8–19. These fractions were stripped on a rotary evaporator and dried overnight at ambient temperature in a vacuum oven in the presence of phosphorous pentoxide to obtain a total of 11.41 g in total fraction weight. Select fractions were analyzed by gas chromatography (GC) and by gel permeation chromatography (GPC). GC results indicated that Intermediate C was the major component. GPC analyses indicated that Intermediate C and Byproduct D were present in all fractions but the relative ratio of Intermediate C steadily increased with increasing fraction number. Thus, the latter chromatography fractions afforded Intermediate C in highest purity containing the smallest quantities of Byproduct D. Byproduct D is composed of several isomeric forms and this mixture is named as follows by IUPAC: (cis, cis-); (cis, trans-); or (trans, trans)-bis-1,4-{[(2-phenyl-1,3-dioxan-5-yl)oxy]methyl}benzene.

Preparation of Intermediate E

Intermediate E is named as follows by IUPAC: 4-{[(2-hydroxy-1-(hydroxymethyl)ethoxy]methyl}benzyl methoxyacetate.

Fractions 6–15 from Intermediate C (8.15 g) obtained by column chromatography (described above) were transferred to a one liter Morton flask equipped with a mechanical stirrer and 489 ml of 90/10 (v/v) acetic acid/water were added. After stirring for thirty minutes, an additional 81.5 ml of acetic acid/water (90/10) was added. After stirring rapidly for 18.5 hours at ambient temperature, a sample was removed which was found to be depleted in Intermediate C by proton NMR spectroscopy. After the reaction mixture had been stirred approximately 22 hours, the material was stripped on a rotary evaporator with vacuum pump pressure using a bath temperature of approximately 34° C. Portions of acetonitrile were added to aid the removal of residual acetic acid and water by azeotropic distillation. The resulting material was dried further at ambient temperature in a vacuum oven using a vacuum pump to obtain 6.25 g of a yellow solid.

This material was shown to contain Byproduct F, named as follows by IUPAC: bis-1,4-{[2-hydroxy-1-(hydroxymethyl)ethoxy]methyl}benzene. In order to remove Byproduct F, this material was magnetically stirred with 345 ml methylene chloride for three hours and this mixture was then filtered through a 0.45 micron filter. The filter cake was washed with methylene chloride and dried at ambient temperature under high vacuum to give 0.975 g Byproduct F. The proton and carbon-13 NMR spectra of Byproduct F were in agreement with its structure. The filtrate was stripped to give 5.09 g material which was determined by GC (after trimethysilylation with trimethylsilyl chloride and hexamethyldisilazane in pyridine) to contain 85.8% Intermediate E and 2.8% Byproduct F, with the remainder being unknown components (percentages express the relative area percentages of GC peaks). The proton and carbon-13 NMR spectra, infrared (IR) spectrum, and GC/MS spectrum (after trimethylsilylation with trimethylsilyl chloride and hexamethyldisilazane in pyridine) were in agreement with the structure of Intermediate E.

The entire procedure described above for hydrolysis of Intermediate C was repeated with Fractions 16–19 of impure Intermediate C (1.07 g) obtained from the same column chromatography described above. Using essentially the same procedure described above in a scaled fashion, 0.72 g of a product was obtained that was indicated by GC analysis (after trimethylsilylation) to contain 92.2% Intermediate E and 1.5% Byproduct F, with the remainder being unidentified.

These fractions were purified by recrystallization from isooctane/THF solvent mixtures which led to only small reductions in Byproduct F in low recrystallization yields. However, semipreparative HPLC, using a normal phase column and gradients of isooctane and THF as the mobile phase, gave Intermediate E in which Byproduct F was reduced to below detectable limits (determined by GC after trimethylsilylation).

Preparation of Product Compound 1

Compound 1 is named as follows by IUPAC: 2-{[4-(hydroxymethyl)benzyl]oxy}propane-1,3-diol.

Intermediate E (0.558 g) was dissolved in 10 ml dry methanol (distilled in glass) and this solution was transferred to a thick walled glass bottle containing a magnetic stir bar. After bubbling argon through this solution for 15 minutes to remove dissolved oxygen while cooling the solution to 0 C., ammonia gas was bubbled into this solution through a hypodermic needle for approximately 0.5 hour. The ammonia gas was initially passed through a tower of sodium hydroxide pellets to remove residual water from the gas. The bottle was then capped with a Teflon™-lined crown seal and allowed to stir for ten hours while warming to ambient temperature. The bottle was then opened and the ammonia was removed by an argon purge. The methanolic solution was then stripped in a rotary-evaporator to obtain a brown gummy solid.

This solid was dissolved in approximately 0.5 ml dry methanol and approximately 5 ml dry diethyl ether was added. The solution became turbid after storing overnight in a freezer at approximately −30° C. and a crystalline solid formed. The supernatant liquid was decanted and the solid was washed with ether and dried under vacuum to obtain 0.164 g yellow-white crystalline solid. GC analysis of this material (after trimethylsilylation) indicated this material to be only approximately 80% pure. This material was then recrystallized two times from 10/1 (v/v) diethyl ether/methanol to obtain a white crystalline material. Proton and carbon-13 NMR spectra obtained from the second recrystallization were in accord with the structure of Compound 1. Two crops of crystals were obtained from a third recrystallization, the first crop weighing 71 mg and the second crop weighing 35 mg. GC analysis of the first crop (after trimethylsilylation) indicated that this material was approximately 97% pure with one slightly later eluting peak representing approximately 2% of the total peak area. The proton NMR spectrum of the first crop was in accord with the structure of Compound 1.

EXAMPLE C1

Crosslinker Preparation

This example illustrates a method for making an isophoronediisocyanate capped 1,4-butanediol (IPDI-NCO)

crosslinker useful with the invention. The acronym IPDI-NCO is used to represent a structure more completely described as Formula 3:

OCN-{IP-NHCO$_2$-BD-O$_2$CNH}$_n$-IP-NCO  (5)

where n=1–3 with n=1 greatly predominating.

Vacuum distilled (center cut), dry, 1,4-butanediol (BD, Aldrich 24,055-9), 4.5 g (0.050 mole) was added to a previously flame dried, and cooled while flushing with dry argon, 2 liter Pyrex™ Erlenmeyer flask. A tared 1000 ul, Teflon plunger, microsyringe was used for transfer. Dry chloroform (CHCl$_3$, Burdick and Jackson, B&D, distilled in glass, 478.4 g, 318.9 cc) was added to the BD using a flame-dried 1-liter Pyrex™ graduate while a mild argon flush was maintained. About 20 g of Fluka™ 3A molecular sieve was added to the solution to ensure that no water was present or picked up. Separately, a 2-liter three-neck (standard taper size 24/40 necks) round bottom reaction flask containing a football-shaped Teflon coated magnetic stir bar was flame dried and cooled while flushing with dry argon. The flask and stir bar were then tare weighed (296.16 g) and clamp mounted on a rack in a fume hood for conducting the reaction. A 1-liter Pyrex™ dropping funnel with a bottom 24/40 male joint and a drip tip, and a pressure equalizing side arm, was placed into one of the side 24/40 female joints. A flame-dried, water cooling equipped reflux condenser was placed in the other side joint. The assembled apparatus was all re-flame-dried and cooled while flushing with argon. The argon was passed through the top of the dropping funnel, which had a side-arm gas inlet adapter affixed, through the reaction flask, and exited from a gas outlet adapter at the top of the water cooling equipped condenser. The outlet gas was then passed through a mineral oil bubbler to allow adjustment and visual observation of the gas flow rate. The center port of the reaction flask was closed with a 24/40 stopper. Then, the reaction flask assembly was removed from its mounted position on the rack, while maintaining a slow argon flush, and 222.5 g (1.00 Mole) of center cut vacuum distilled isophorone diisocyanate (Aldrich 31,62-4, IPDI) was added to the unmounted reaction flask assembly, which was placed on a large torsion balance to accurately weigh the IPDI. The IPDI was poured from the argon flushed 1 liter Pyrex™ round bottom distillation receiver into which it had been distilled (under argon in a flame dried Pyrex™ distillation assembly). The theoretical yield of OCN-IP-BD-IP-NCO crosslinker was calculated to be 26.9 g (0.0105 Mole BD×538.74 g/mole molecular weight of the expected OCN-IP-BD-IP-NCO product).

Similarly 167 g (111 cc) of dry B&D CHCl$_3$ solvent was added to the reaction flask and the assembly was then remounted on the rack in the hood. Then the separately prepared BD in CHCl$_3$ solution (Erlenmeyer flask) was transferred directly to the dropping funnel and rinsed in with three small portions (~10 cc each) of CHCl$_3$ to insure that all BH was transferred, leaving the Fluka 3A molecular sieve in the 2 liter Erlenmeyer flask. The reaction flask was then heated to 50° C. using a thermostatically temperature controlled mineral oil bath mounted on a lab jack, which was raised until the preheated mineral oil level was well above the level of the magnetically stirred clear, colorless IPDI/CHCl$_3$ solution. The CHCl$_3$ solvent quickly boiled and refluxed gently. The CHCl$_3$/BD solution in the dropping funnel was then added in rapid-dropwise fashion over a 2.5 hour period, while maintaining a steady, slow (1 bubble per 2 or 3 seconds) argon purge. The reaction was maintained at 50° C. for 24 hours after BD addition was complete. Then the heat was turned off and the reaction mixture cooled to ambient temperature by removing the 50° C. mineral oil bath and letting the mixture stand over the weekend, while maintaining the slow argon purge. The CHCl$_3$ was then vacuum distilled (stripped) from the reaction flask, while stirring was maintained, by replacing the reflux condenser with a vacuum pump connected through a large capacity, dry ice cooled, trap to collect the distillate. The dropping funnel was also removed and replaced with just the argon inlet adapter. Argon flow was adjusted to nil when vacuum was applied. The mineral oil bath was replaced around the reaction flask and heated only very slightly to maintain a temperature near ambient (~25–27° C.). The CHCl$_3$ was stripped carefully, to avoid foaming, until 175.9 g of a fairly thin, clear, very light yellow, presumably CHCl$_3$ free liquid was obtained. Apparently 51.1 g of IPDI had codistilled with CHCl$_3$ since the total weight of BD+IPDI originally was 227.0 g.

One (1.0) g of the liquid product was added to 25 cc of dry hexane (Aldrich 22,706-4, water<0.002%) in a dry 100 cc Pyrex™ Erlenmeyer flask to test the use of hexane as a purifying medium. A white, emulsion-looking, mixture was obtained, which separated after several hours into a thin layer of clear viscous liquid on the bottom and a clear, colorless upper layer. Since IPDI is very soluble in hexane and the product, with two internal, highly hydrogen bonding urethane bonds, was expected to be hexane insoluble, it was assumed that the thin bottom layer was the desired product and the upper layer was a hexane solution of unreacted IPDI. Hence, the entire batch of product was added to a total of 3.6 liters of the dry hexane in two equal portions in two liter, flame-dried, Pyrex™ Erlenmeyer flasks. The same precipitation phenomenon occurred on the larger scale. After phase separation was complete, the clear, supernatant hexane-IPDI layers were decanted, and the viscous, clear, but very slightly yellow product layers were rinsed with about 50 cc of dry hexane, the product redissolved in about 10 cc of dry methylene dichloride (CH$_2$Cl$_2$) (Aldrich 27,099-7, <0.005% water) and reprecipitated with about 200 cc of dry hexane in each flask. When phase separation was complete, this dissolution and reprecipitation process was repeated.

The two product portions were then combined into a 100 cc, flame dried, one neck, Pyrex™ round bottom flask using several small (~10 cc) amounts of the dry CH$_2$Cl$_2$ solvent. The CH$_2$Cl$_2$ was carefully stripped in a vacuum oven at ambient temperature, then dried overnight in the vacuum oven (~1 Torr) with mild heating (~35° C.). Obtained were 11.87 g of a clear, very light yellow, extremely viscous oil or liquid. This was a 44.1% yield based on the theoretical yield of 26.94 g. A significant portion of the product was apparently removed during the hexane precipitation purification process. This should be recoverably by, for example, separate vacuum distillation of the unreacted IPDI, after distilling all of the precipitation medium hexane. Although this was not done, it is considered very likely that the hexane and unreacted IPDI could be collected and recycled, and virtually all of the product IPDI-BD+IPDI crosslinker product recovered, if this is desired. These products were analyzed by $^1$H NMR and the obtained spectra were found to be fully consistent with their structures.

EXAMPLE C2

This example illustrates the dibutyltin dilaurate catalyzed preparation of TMXDI capped 1,4-butanediol crosslinker: (TMXDI-NCO) which is which is represented by Formula 4:

OCN-{TMX-NHCO$_2$-BD-O$_2$CNH}$_n$-TMX-NCO where n=1–3 with n=1 greatly predominating.

The same two liter reaction flask, magnetic stir bar and handling and flask drying procedures were used as described in Example C1. Thus, 244.3 g (1.000 mole) of 1,3-bis(1-isocyanato-1-methylethyl) benzene (TMXDI, CYTEC Industries) were added to the dried and argon flushed reaction flask. Then 4.506 g (0.050 moles) 1,4-butanediol (BD) were added. Then 100 g (127 cc) anhydrous acetonitrile (Aldrich 27,100-4, water<0.001%) was added to the flask and a clear, colorless, one phase reaction mixture was quickly obtained. Then 0.0365 g (6.115×10$^{-5}$ mole) of dibutyltin dilaurate catalyst was added representing 0.122 mole percent of catalyst based on the 0.050 moles of BD present. The clear, mixture was then stirred at ambient temperature (~23° C.) under a constant argon flush for 9 days. The acetonitrile solvent was then stripped under vacuum while heating the reaction flask to 23–25° C. After distillation ceased, 211 g of a clear, slightly viscous solution of the TMXDI-NCO product dissolved in unreacted TMXDI was obtained, which is 37.8 g less than the expected weight of 248.8 g. Presumably this amount of TMXDI co-distilled with the acetonitrile. The theoretical amount of OCN-TMX-BD-TMX-NCO product, if no dimerization, trimerization, or higher oligomerization occurred, was 28.94 g. Hence, the percentage by weight of expected product in the final mixture was (28.94/211.4)×100=13.69%. A 30.0-g aliquot of the final mixture was taken for product recovery and purification. The theoretical yield of TMXDI-BD-TMXDI product from this aliquot was (0.1369×30.0)=4.11 g.

This aliquot was added to 300 g (455 cc) of anhydrous, reagent grade hexane in a dry 500 ml Erlenmeyer flask, under argon. As in Example C1, a white, emulsion-like suspension was obtained, which gradually separated into two distinct phases comprising a clear, viscous lower layer and a large amount of upper clear, supernatant liquid. This upper layer consisted of hexane and presumably most of the unreacted TMXDI, which is readily soluble in hexane, as well as some portion of the product codissolved in the hexane/TMXDI mixture. The upper phase was decanted and the lower clear product layer was rinsed with about 10 cc of anhydrous hexane twice. The viscous, clear, colorless liquid was redissolved in about 10 cc of dry methylene chloride (CH$_2$Cl$_2$) and reprecipitated in 100 cc anhydrous hexane as before. The supernatant layer was decanted, the viscous, clear product washed with 10 cc hexane and again dissolved in 10 cc CHCl$_2$ and precipitated in 100 cc anhydrous hexane. The final supernatant layer was decanted, the product layer rinsed with more of the anhydrous hexane and the product vacuum dried overnight at ~1 Torr and 30–35° C. to obtain 3.15 g of clear, practically solid, colorless product. This was 76.6% overall yield based on a theoretical 4.11 g of product from the aliquot. $^1$H NMR analysis of this three times-precipitated product indicated 99+% purity.

EXAMPLE C3

This example illustrates the preparation of a dibenzylic alcohol containing crosslinker. 4-Hydroxymethyl-(beta-hydroxyethoxy)benzene, hereafter referred to as Compound G, is reacted with MDI in a mole ratio of two moles of compound G and one mole of MDI. This constitutes an equimolar ratio of aliphatic primary hydroxyl and isocyanate groups. The reactants are melted and heated to 180–200° C. After maintaining this temperature for about 30 minutes, the mixture is cooled slowly to the temperature at which the mixture solidifies over about a 30–60 minute time period. Obtained will be the diurethane obtained from the reaction of the two primary aliphatic hydroxyethyl groups and the two MDI isocyanate groups. The benzylic hydroxyl groups will be essentially uncombined and will constitute the end of groups of this diurethane.

EXAMPLE C4

This example illustrates the preparation of a tribenzylic alcohol containing crosslinker. Compound G of the previous example is reacted with a triisocyanate compound available commercially. This compound is Compound H from Rhone-Poulenc known as Tolonate® (HDT) Trimer. Compound G is reacted with Compound H in a mole ratio of three moles of Compound G and one mole of Compound H. This constitutes an equimolar ratio of aliphatic primary hydroxyl and isocyanate groups. The reaction is carried out following the procedure of Example C3. Obtained will be the tris (hydroxymethyl)-capped-tri-urethane coupled product obtained from the formation of stable urethane bonds between the three primary hydroxyethyl groups of Compound G and the three isocyanate groups of Compound H. The three benzylic hydroxyl groups will be essentially uncombined and will constitute available reactive groups for the formation of reversible urethane crosslinking bonds when combined in a minor amount (less than or equal to 50 mole percent of the hydroxyl groups used) polymer with a major amount (less than or equal to 50 mole percent of the hydroxyl groups used, from di-benzylic hydroxyl compounds or oligomers such as 1,4-benzenedimethanol and/or the di-hydroxymethyl compound product of Example C3.

EXAMPLE P1

This example illustrates the preparation of a control polyurethane. The control polyurethane was prepared without using Compound 1. 4,4'-Diphenylmethane diisocyanate commonly referred to as methylenediphenyl-diisocyanate (MDI), polybutylene adipate (PBA) with a molecular weight of about 1986 (a high molecular weight polyol with two aliphatic hydroxybutyl end groups), and 1,4-butanediol (BD) were used. The MDI and BD were reagent grade chemicals obtained from Aldrich (MDI, Aldrich 25,643-9; BD, Aldrich 24,055-9) but were vacuum distilled before use. The PBA is a commercially available polyurethane polymerization-quality aliphatic polyester diol. All reactants were handled under dry argon gas. The polymerization was performed in a silylated Pyrex™ reactor tube (~50 cc heavy walled test tube) equipped with a standard taper 24/40 top joint. Silylation of the Pyrex™ glass surface was carried out using an octadecyltrialkoxysilyl functionalized silane (Siliclad®), Gelest Product No. SIS 6952-0, lot-964-3014, 20% active). A 1% solution of this product is made up in distilled water. The glass is rinsed with 5% aqueous NaOH followed by several distilled water rinses, then the 1% Siliclad®. It is then rinsed with water again and dried at about 100° C. for one hour to provide an extremely stable hydrophobic surface. A simple head adapter with a small opening on top just large enough for a thin stainless steel spatula to fit through, and a side argon inlet tube, was placed in the top standard taper joint during the polymerization. The head adapter was removed from the Pyrex™ reaction tube and 8.937 g (4.50 mmole) of PBA and then 2.463 (9.842 mmole) of MDI were weighed into the dry (silylated) tube. The head adapter was reinstalled and an argon flush was immediately started. The tube was lowered into a Woods metal bath preheated to 97° C. The contents melted and were carefully stirred at 90–100° C. for one hour. Care was taken not to splash any reaction mixture on the upper walls of the tube. A moderate viscosity increase occurred during the one hour of heating, with essentially all of the increase occurring in the first 30–45 minutes.

Then 0.4908 g (5.446 mmoles) of 1,4-BD was quickly added directly onto the top of the melt via a pre-tared 1000 ml syringe while maintaining the argon flush. The Woods metal bath was then heated rapidly from 100° C. to approximately 200° C. while stirring was continued over a 6–7 minute time period. Stirring was continued while heating at 197–200° C. for about 30 minutes. During the first 10–15 minutes of this period the melt viscosity increased rapidly until a quite viscous but still readily hand stirrable melt was obtained. This melt viscosity did not noticeably change over the last 10-15 minutes of stirring at 197–200° C. A fiber was drawn from this melt, which was quite strong and elastic at room temperature. The hot molten polymer was then rapidly removed from the small reaction vessel, into a Teflon dish, and allowed to cool. The product was a tough, strong elastic thermoplastic (a thermoplastic polyurethane elastomer).

A post polymerization treatment to insure that polymerization was complete was carried out by heating the polymer mass overnight at 80° C. in a vacuum oven set at about 1 Torr.

The product, both before and after this vacuum oven treatment was a strong, tough, elastic thermoplastic. A small piece readily dissolved in dry N,N-dimethylformamide (DMF) in several hours at room temperature. A small piece was also submitted for gel permeation chromatography (GPC) molecular weight analysis using a Waters GPC instrument and tetrahydrofuran (THF) as solvent. The GPC was calibrated using four narrow molecular weight polystyrene standards. The GPC-determined molecular weights of a commercial Spandex-type, melt processible, elastic thermoplastic polyurethane were also measured at the same time. The number average (Mn), peak average (Mp), and weight average (Mw) molecular weights for the commercial thermoplastic polyurethane elastomer were Mn=57,539; Mp=126,884; and Mw=147,283. The molecular weight data for the laboratory prepared control thermoplastic polyurethane elastomer were Mn=52,200; Mp=131,525; and Mw=144,381. This shows that a thermoplastic polyurethane elastomer based on an aliphatic polyesterdiol, MDI and 1,4-Butanediol can readily be prepared having molecular weight parameters very close to those desired and found in a commercial product.

EXAMPLE P2

This example illustrates the production of a thermoplastic polyurethane elastomer with pendant benzylic hydroxyl groups using Compound 1.

The polymerization was performed in a silylated Pyrex™ reaction tube (~50 cc volume) equipped with a 24/40 joins and using a molten Woods metal bath for heating. A 24/40 adapter with an argon inlet was inserted into the top of the Pyrex™ reaction tube. Dry argon was slowly, but constantly, flushed through a small opening in the reactor tube during the reaction. The reaction mixture was stirred with a thin stainless steel spatula inserted through a small opening in the top of gas inlet adapter. Constant, slow stirring was performed due to the small scale used and the requirement that ingredients be mixed but not spread upward on the tube surface. This assured that all material was available for reaction.

Polybutylene adipate (2.2343 g; 1.125 mmole; MW=1986; eq. wt.=993) and 0.6356 g (2.540 mmole) of MDI were weighed to four decimal places directly into the reaction tube using an analytical balance placed in a glove bag which was flushed and filled with argon. All reactants were carefully placed onto the bottom of the reaction tube. After removing the reactor tube from the glove bag with the head adapter already in place, the mixture was heated while stirring at 100–110° C. for one hour during which time it became moderately viscous. The reaction tube was lifted just out of the molten metal bath, which was then heated rapidly up to 197–200° C. Then, 1,4-BD (0.1177 g; 1.3060 mmole) was quantitatively carefully added directly onto the still argon-flushed prepolymer mixture from a preweighed 1000 microliter syringe, which was also reweighed after addition of 1,4-BD to insure accurate weight addition by difference. Immediately after this Compound 1 (0.0146 g; 0.0688 mmole) was added, also carefully placing it on top of the reaction mixture. A monofunctional hydroxylic end capper compound, diethyleneglycol monoethyl ether (0.0107 g; 0.0797 mmole) was then added from a microsyringe, again weighing the syringe before and after the addition. These additions were performed while maintaining an argon flow. As soon as the additions were complete, the reactor tube was lowered back into the Woods metal bath and the mixture was heated at 197-200° C. while carefully stirring for 30 minutes.

The total hydroxyl content of the reaction mixture was 5.0794 mmole, while the total isocyanate content was 5.0796 mmole. The Compound 1 hydroxyl content represented a 5 mole percent replacement of butanediol hydroxyl content. Table 3 shows the quantities of all components used to prepare the polymer.

TABLE 3

Polymer Components

| Component | Weight (g) | Component Amount (mmole) | Hydroxyl Amount (mmole) | Isocyanate Amount (mmole) |
|---|---|---|---|---|
| PBA[a] | 2.2343 | 1.125 | 2.250 | 0 |
| MDI | 0.6356 | 2.540 | 0 | 5.0796 |
| 1,4-BD | 0.1177 | 1.3060 | 2.6121 | 0 |
| Compound 1 | 0.0146 | 0.0688 | 0.1376[b] | 0 |
| End Capper[c] | 0.0107 | 0.0797 | 0.0797 | 0 |
| Total: | 3.0129 | N/A | 5.0794 | 5.0796 |

[a]polybutyleneadipate
[b]his number of moles includes only the two primary hydroxyl groups and not the benzylic hydroxyl group
[c]diethylene glycol monoethyl ether (MW = 134.18; dried over Fluka 3A molecular sieves.

EXAMPLE P3

This example illustrates the production of a thermoplastic polyurethane elastomer with benzylic alcohol-derived urethane linkage crosslinks in the is hard segment (A) of this elastomer. The resultant thermoplastic polyurethane elastomer has an (A-B-)$_n$-A type structure where the hard segment (A) is a reaction product of 1,4-BD and MDI; and the soft segment (B) is a reaction product of polybutylene adipate and MDI.

The reactor tube of Example P2 was then removed from the hot Woods metal bath and 2.2250 g of the thermoplastic polyurethane elastomer with pendant benzylic hydroxyl groups was removed (73.85% of the calculated total weight of 3.0129 g), thus leaving a calculated quantity of 0.7878 g of the thermoplastic polyurethane (26.15%) with pendant benzylic hydroxyl groups (presumably mostly unreacted) in the reaction tube which contained a calculated quantity of 0.0180 mmole of Compound 1. Great care was taken while removing this portion of polyurethane of Example P2, to not leave any polymer deposits on the walls of the reactor tube, above the polymer melt line. An isocyanate terminated crosslinker made from an excess of isophorone diisocyanate with 1,4-butanediol (IPDI-NCO from Example C1; molecular weight=534.7), was then added to the melt in an amount based on the presumed presence of 90% of the theoretical amount of benzylic hydroxyl groups. This quantity corresponded to 0.90×(0.0180/2)=0.0081 mmole or 4.3 mg crosslinker, which was carefully added to the top surface of the remaining melt. The total quantity of MDI derived carbamate groups in the thermoplastic polyurethane elastomer remaining in the reactor tube was 2×5.08×0.2615=2.66 mmoles. It should be noted that the maximum quantity of urethane groups derived from the benzylic hydroxyl groups of Compound 1 and the IPDI-based crosslinker (0.0081 mmole) was 2×0.0081=0.0162 mmole of urethane groups. This quantity of benzylic hydroxyl-derived urethane groups corresponds to 0.61% of the total urethane groups in this sample {0.0162 mmole/(2.66 mmole+0.0162 mmole)×(100)=0.61%}. It was calculated that the number of covalent benzylic alcohol-derived urethane crosslinks in the hard segments (A) of this thermoplastic polyurethane elastomer was approximately 1.1 percent of all urethane crosslinks in the hard segments. Based on a molecular weight of about 200,000 it can be calculated that, about one of approximately ten hard segments has a benzylic crosslinking site and each hard segment contains an average of about 4.6 repeat units of 1,4-BD and MDI. The reactor tube was then placed back in the molten metal bath (maintained at about 200° C.) and the crosslinker was very carefully and thoroughly mixed into the quite viscous melt over a five minute period after which the tube was allowed to cool slowly to ambient temperature.

The viscosity of the molten polyurethane at 200° C. was essentially the same as the final melt viscosity of the control thermoplastic polyurethane elastomer in Example P1 at 200° C. and the experimental thermoplastic polyurethane elastomer product final melt viscosity in Example P2, both before and after adding the isophorone-derived crosslinker (IPDI-NCO). Hence, essentially no crosslinking was in evidence at 200° C. after addition of this crosslinker. The molecular weight of the formed polymer had a molecular weights ($MW_w$) of about 200,000.

This product, a quite viscous but still readily hand-stirrable melt at 200° C., was then cooled. Very importantly, a small piece of this material when placed in N,N-dimethylformamide (DMF) at ambient temperature swelled slightly over 3–4 hours. It did not change (swell) any additional amount after 24 hours more at room temperature. The fact that it did not dissolve showed that it was crosslinked at ambient temperature, as desired. In contrast, the control material prepared in Example P2, which was removed from the reactor tube before the isophorone-based crosslinker was added, dissolved readily in DMF over a 3–4 hour period at ambient temperature to obtain a clear solution that was qualitatively free of gel (i.e. undissolved polymer), indicating that this material was not crosslinked. These solubility test results provide strong evidence that Compound 1 was largely copolymerized into the hard segment of the backbone structure of the thermoplastic polyurethane elastomer with largely non-reacted pendant benzylic hydroxyl groups, until the IPDI-NCO crosslinker isocyanate groups were added. These results are consistent with the urethane linkages that are present in crosslinks between the thermoplastic polyurethane elastomer polymer chains, and which are derived from the benzylic alcohol groups of Compound 1, undergoing significant reversion to benzyl alcohol and isocyanate functionality at 200° C. These urethane-based crosslinks obviously reformed when the sample was cooled below the reversion onset temperature as evidenced by the insolubility of this sample in DMF. These results were predicted by the IR-based reversion studies of urethane linkages composed of benzylic alcohols and cycloaliphatic isocyanates, which indicated a reversion onset temperature of about 150° C. in a model compound (as seen in Table 2, Pair 2). Demonstration of moderate viscosity in this thermoplastic polyurethane elastomer at 200° C., while being crosslinked at ambient temperatures and temperatures up to the reversion onset temperature, indicates that this type material can be readily processed by melt spinning (to form fibers), injection molding, and extrusion to form a wide variety of useful materials by these processes, which would still benefit from having crosslinks below the reversion onset temperature. Interestingly, when the crosslinked thermoplastic polyurethane elastomer was reheated back to 200° C. under argon gas, fibers could readily be drawn from the melt which were quite strong and elastic at room temperature. These results are compatible with the benzylic alcohol-derived urethane linkages again undergoing reversion at 200° C.

Figure 3:
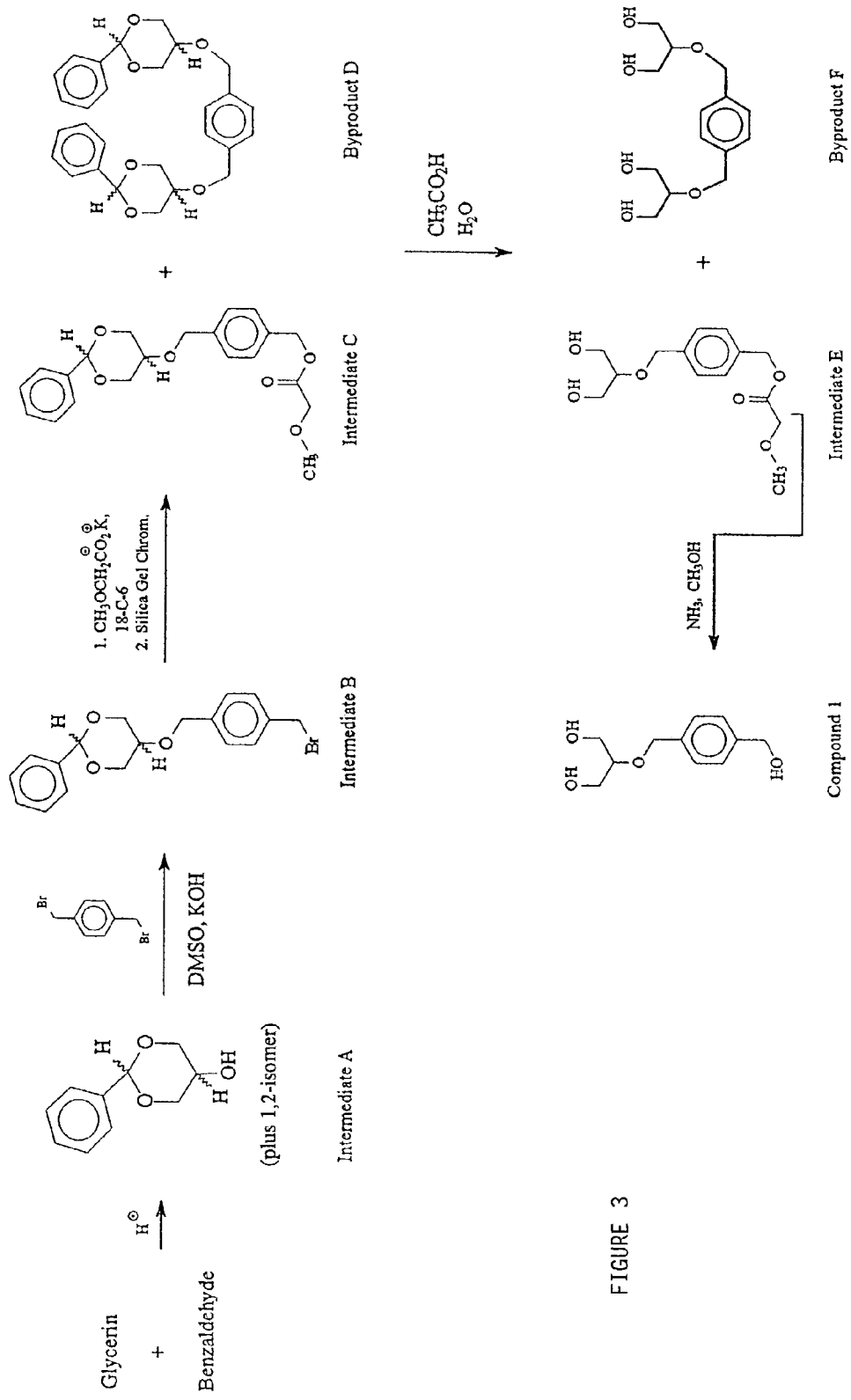
FIG. 3 illustrates a flow chart for a method for producing Compound 1 including chemical structures associated with starting materials, intermediates, byproducts, and final product.

Films were then prepared from both the crosslinked material containing Compound 1 and the control material by pressing these materials between sheets of Teflon in a heated press (at 200–300 lbs. of force at about 180–190° C.). Thin clear, tough, elastic films having a thickness of 1–2 mils were readily obtained. Interestingly, IR reversion studies indicated that the reversion onset temperature of this crosslinked polymer was about 170° C. (see FIG. 3) which is higher than the onset temperatures of about 150° C. observed with model compounds containing urethane linkages derived from benzylic alcohols and cycloaliphatic isocyanates. It is currently believed, without being held to any specific mechanism, that this higher reversion onset temperature in this crosslinked thermoplastic polyurethane elastomer is due to a polymer matrix effect, in which urethane cleavage is impeded due to reactive components being held in place and (or) an increased reaction rate for the recombination of benzylic alcohol and isocyanate groups being held by the polymer matrix in relatively close proximity. Nevertheless, in spite of the apparent higher reversion onset temperature in the crosslinked thermoplastic polyurethane elastomer, it is still apparent, based on observed physical properties, that a significant percent of the urethane-based crosslinks between the thermoplastic polyurethane elastomer polymer chains, which are derived from the benzylic alcohol groups of Compound 1, underwent reversion to benzyl alcohol and isocyanate functionality when heated to 200° C.

EXAMPLE P4

This example illustrates the production of a reversible thermoplastic polyurethane elastomer which contains, crosslinked MDI urethane bonds at room temperature and temperatures up to the reversion onset temperature, by using Compound 1 at 5 mole percent replacement of BD and an amount of MDI sufficient to provide an isocyanate content that is equivalent to the total hydroxyl content, including the benzylic hydroxyl content. The benzylic urethane crosslinks will be present at room temperature and up to at least about 150° C., but will reverse when heated above this temperature to about 200° C., allowing the thermoplastic polyurethane elastomer to melt and be processed by melt spinning, injection molding and extrusion processes.

The polymerization is performed in silylated Pyrex™ reaction tubes (~50 cc volume) equipped with 24/40 joints and using a molten Woods metal bath for heating. A 24/40 adapter with an argon inlet is inserted into the top of the Pyrex™ reaction tube. Dry argon is slowly, but constantly, flushed through a small opening in the reactor tube during the reaction. The reaction mixture is stirred with a thin stainless steel spatula inserted through a small opening in the top of gas inlet adapter. Constant, slow stirring is performed due to the small scale used and the requirement that ingredients be mixed but not spread upward on the tube surface. This assures that all material is available for reaction.

Next, 2.2343 g (1.125 m Mole) of polybutylene adipate (MW=1986, Eq. wt.=993) and 0.6442 g (2.5741 mmole) of MDI is weighed to four decimal places directly into the reaction tube using an analytical balance placed in a glove bag which is flushed and filled with argon. All reactants are carefully placed onto the bottom of the reaction tube. The reactor tube is then removed from the glove bag with the head adapter already in place. The mixture is heated while stirring at 100–110° C. for one hour during which time it becomes moderately viscous. The reaction tube is lifted just out of the molten metal bath, which is then heated rapidly up to 197–200° C. Then, 0.1177 g (1.3060 mmole) of 1,4-BD is quantitatively carefully added directly onto the still argon flushed prepolymer mixture from a preweighed 1000 microliter syringe, which is also reweighed after addition of 1,4-BD to insure accurate weight addition by difference. Immediately after this 0.0146 g (0.0688 mmole) of Compound 1 is added, also carefully placing it on top of the reaction mixture. The end capper, diethyleneglycol ethyl ether, 0.0107 g (0.0797 mmole) is then added from a microsyringe, again weighing the syringe before and after the addition. These additions are performed while maintaining the argon flow. As soon as the additions are complete, the reactor tube is lowered back into the Woods metal bath and the mixture is heated at 197–200° C. while carefully stirring for 30 minutes.

The total reactive hydroxyl content of the reaction mixture is 5.1482 mmole, while the total isocyanate content is 5.1482 mole. The Compound 1 hydroxyl content represents 5 mole % replacement of 1,4-BD hydroxyl content. Table 4 shows the quantities of all components that will be used to prepare the polymer.

TABLE 4

| | Polymer Components | | | |
|---|---|---|---|---|
| Component | Weight (g) | Component Amount (mmole) | Hydroxyl Amount (mmole) | Isocyanate Amount (mmole) |
| PBA[a] | 2.2343 | 1.125 | 2.250 | 0 |
| MDI | 0.6442 | 2.5741 | 0 | 5.1482 |
| 1,4-BD | 0.1177 | 1.3060 | 2.6121 | 0 |
| Compound 1 | 0.0146 | 0.0688 | 0.2064[b] | 0 |
| End Capper[c] | 0.0107 | 0.0797 | 0.0797 | 0 |
| Total: | 3.0215 | N/A | 5.1482 | 5.1482 |

[a]polybutyleneadipate
[b]this number of moles includes the three hydroxyl groups of Compound 1
[c]diethylene glycol monoethyl ether (MW = 134.18); dried over Fluka 3A molecular sieves.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention

We claim:

1. A compound comprising:

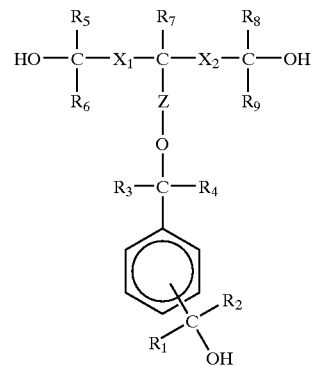

wherein $R_1$ and $R_2$ are identical or different and represent a group selected from —H and hydrocarbon groups containing up to ten carbon atoms; wherein $R_3$ and $R_4$ are identical or different and represent a group selected from —H and hydrocarbon groups containing up to ten carbon atoms; wherein $R_5$ through $R_9$ are identical or different and represent hydrogen, methyl, ethyl, or propyl; wherein $X_1$ (left arm), $X_2$ (right arm) and Z may be the same or different and represent none (no additional segment present), methylene, ethylene, or p-phenylene; and wherein the benzylic hydroxyl moiety may be positioned at the para, meta or ortho position.

2. The compound according to claim 1 comprising:
2-{[(4-hydroxymethyl)benzyl]oxy}-1,3-propanediol.

* * * * *

UNITED STATES PATENT AND TRADEMARK OFFICE
CERTIFICATE OF CORRECTION

PATENT NO. : 6,989,466 B2
DATED : January 24, 2006
INVENTOR(S) : Herman P. Benecke and Richard A. Markle It is certified that error appears in the above-identified patent and that said Letters Patent is hereby corrected as shown below:

Column 1,
Line 7, "2003" should be -- 2000 --.

Column 28,
Line 56, "his" should be -- this --.

Signed and Sealed this

Eleventh Day of April, 2006

JON W. DUDAS
*Director of the United States Patent and Trademark Office*